US012494334B2

(12) United States Patent
Park

(10) Patent No.: US 12,494,334 B2
(45) Date of Patent: Dec. 9, 2025

(54) DIRECT CURRENT RELAY

(71) Applicant: LS ELECTRIC CO., LTD., Anyang-si (KR)

(72) Inventor: Jinhee Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 593 days.

(21) Appl. No.: 17/612,443

(22) PCT Filed: Apr. 9, 2020

(86) PCT No.: PCT/KR2020/004805
§ 371 (c)(1),
(2) Date: Nov. 18, 2021

(87) PCT Pub. No.: WO2020/256263
PCT Pub. Date: Dec. 24, 2020

(65) Prior Publication Data

US 2022/0223362 A1 Jul. 14, 2022

(30) Foreign Application Priority Data

Jun. 18, 2019 (KR) ........................ 10-2019-0072049

(51) Int. Cl.
*H01H 9/44* (2006.01)
*H01H 1/54* (2006.01)
(Continued)

(52) U.S. Cl.
CPC .............. *H01H 50/18* (2013.01); *H01H 1/54* (2013.01); *H01H 9/443* (2013.01); *H01H 50/54* (2013.01); *H01H 2001/545* (2013.01)

(58) Field of Classification Search
CPC ...................................................... H01H 9/443
(Continued)

(56) References Cited

U.S. PATENT DOCUMENTS 7,145,422 B2 * 12/2006 Imanishi ................ H01H 9/443
335/133
8,143,978 B2 3/2012 Shen
(Continued)

FOREIGN PATENT DOCUMENTS

CN 105762020 A 7/2016
CN 106356225 A 1/2017
(Continued)

OTHER PUBLICATIONS

Extended European Search Report for related European Application No. 20825785.7; action dated Oct. 12, 2023; (32 pages).
(Continued)

*Primary Examiner* — Alexander Talpalatski
(74) *Attorney, Agent, or Firm* — K&L Gates LLP

(57) ABSTRACT

A direct current relay comprises a magnetism forming unit accommodated in a frame unit. The magnetism forming unit comprises a first magnet member and a second magnet member. A magnetism strengthening member is provided between the first and second magnet member. The magnetism strengthening member strengthens the magnetic field formed between the first and second magnet member. Therefore, the flow of the magnetic field formed inside an arc chamber is strengthened so as to effectively form an arc extinguishing path. The magnetism strengthening member can apply an electromagnetic attractive force to a movable core. Therefore, the movable core receives the electromagnetic attractive force according to magnetization of a fixed core, and also the electromagnetic attractive force from the
(Continued)

magnetism strengthening member. Thus, since a driving force for moving the movable core increases, the operation reliability of the movable core can be improved.

12 Claims, 14 Drawing Sheets

(51) Int. Cl.
*H01H 50/18* (2006.01)
*H01H 50/54* (2006.01)

(58) Field of Classification Search
USPC .......................................................... 335/201
See application file for complete search history.

(56) References Cited

U.S. PATENT DOCUMENTS

| | | | | |
|---|---|---|---|---|
| 8,749,331 | B2 * | 6/2014 | Kashimura | H01H 51/22 335/126 |
| 8,994,482 | B2 * | 3/2015 | Yokoyama | H01H 9/362 335/131 |
| 9,117,605 | B2 * | 8/2015 | An | H01H 50/163 |
| 9,460,871 | B2 * | 10/2016 | Naka | H01H 1/66 |
| 9,520,256 | B2 * | 12/2016 | Naka | H01H 9/443 |
| 9,859,078 | B2 * | 1/2018 | Kubono | H01H 1/06 |
| 11,043,346 | B2 * | 6/2021 | Ishikawa | H01H 9/443 |
| 11,120,961 | B2 * | 9/2021 | Hasegawa | H01H 50/58 |
| 11,348,750 | B2 * | 5/2022 | Kawaguchi | H01H 9/443 |
| 2013/0012037 | A1 | 1/2013 | Enomoto et al. | |
| 2015/0022293 | A1 * | 1/2015 | Naka | H01H 50/60 335/153 |
| 2015/0380193 | A1 * | 12/2015 | Kashimura | H01H 50/54 335/201 |
| 2017/0162353 | A1 | 6/2017 | Kubono | |
| 2018/0144893 | A1 | 5/2018 | Konishi et al. | |
| 2023/0411096 | A1 * | 12/2023 | Yoo | H01H 50/546 |

FOREIGN PATENT DOCUMENTS

| | | | |
|---|---|---|---|
| CN | 109417002 | A | 3/2019 |
| DE | 112018004056 | T5 | 4/2020 |
| JP | 2004152703 | A | 5/2004 |
| JP | 2014154492 | A | 8/2014 |
| JP | 2016012504 | A | 1/2016 |
| JP | 2016012505 | A | 1/2016 |
| JP | 6146504 | B1 | 6/2017 |
| JP | 6375745 | B2 | 8/2018 |
| JP | 2019036431 | A | 3/2019 |
| KR | 2020110007655 | U | 8/2011 |
| KR | 101116380 | B1 | 3/2012 |
| KR | 101216824 | B1 | 12/2012 |
| KR | 20140019826 | A | 2/2014 |
| KR | 101661396 | B1 | 9/2016 |
| KR | 2020160003787 | U | 11/2016 |
| KR | 2020170003324 | U | 9/2017 |
| KR | 101902012 | B1 | 11/2018 |

OTHER PUBLICATIONS

International Search Report for related International Application No. PCT/KR2020/004805; report dated Dec. 24, 2020; (5 pages).
Written Opinion for related International Application No. PCT/KR2020/004805; report dated Dec. 24, 2020; (6 pages).
Search Report for related Korean Application No. 10-2019-0042655; report dated Jun. 18, 2019; (12 pages).
Office Action for related Chinese Application No. 202080032772.7; action dated Jul. 8, 2024; (8 pages).
Office Action for related Korean Application No. 10-2019-0072049; action dated Sep. 12, 2024; (6 pages).
Notice of Allowance in connection with related Korean Application No. 10-2019-0072049; action dated Mar. 12, 2025; (6 pages).

* cited by examiner (a)

(b)

(a)

(b)

(a)

(b)

(a)

(b)

DIRECT CURRENT RELAY

CROSS-REFERENCE TO RELATED APPLICATIONS

This application is the National Stage filing under 35 U.S.C. 371 of International Application No. PCT/KR2020/004805, filed on Apr. 9, 2020, which claims the benefit of earlier filing date of and right of priority to Korean Application No. 10-2019-0072049 filed on Jun. 18, 2019, the contents of which are all hereby incorporated by reference herein in their entirety.

FIELD

The present disclosure relates to a direct current (DC) relay, and more specifically, a DC relay having a structure capable of setting a direction of electromagnetic force for extinguishing arc regardless of polarity of a fixed contact, and increasing driving force for moving a movable contact to be brought into contact with the fixed contact.

BACKGROUND

A direct current (DC) relay is a device that transmits a mechanical driving signal or a current signal using the principle of an electromagnet. The DC relay is also called a magnetic switch, and is generally classified as an electrical circuit switching device.

Referring to FIGS. 1 to 3, a DC relay 1000 according to the related art includes a contact part 1100, permanent magnets 1200, and a core part 1300.

The contact part 1100 includes a fixed contact 1110 and a movable contact 1120. When control power is applied, the movable contact 1120 is moved toward the fixed contact 1110 to be brought into contact with the fixed contact 1110. Accordingly, the DC relay 1000 can be electrically connected to external power supply and load.

Driving force for moving the movable contact 1120 is generated by the core part 1300. When control power is applied, coils 1350 wound around a bobbin 1340 generates an electromagnetic field. At this time, a fixed core 1310 is magnetized and attractive force is generated between the fixed core 1310 and a movable core 1320.

Since the fixed core 1310 is fixed, the movable core 1320 is moved toward the fixed core 1310. At this time, the movable core 1320 is moved upward together with a shaft 1330 connected to the movable core 1320. Accordingly, the fixed contact 1110 and the movable contact 1120 can be brought into contact with each other.

When the control power is not applied any more, the attractive force between the fixed core 1310 and the movable core 1320 is eliminated. As the movable core 1320 is moved upward, a spring 1321 is compressed and stores restoring force. When the attractive force disappears, the spring 1321 is tensioned. Accordingly, the fixed contact 1110 and the movable contact 1120 are spaced apart from each other, thereby generating arc.

The generated arc is extinguished through a preset path and must be discharged to the outside of the DC relay 1000. To this end, the DC relay 1000 includes the permanent magnets 1200 for generating an electromagnetic field.

Referring to (a) of FIG. 1, a plurality of fixed contacts 1110 are provided. Current is introduced into an inside of the DC relay 1000 through a fixed contact 1110*a* on the right, flows through the movable contact 1120, and then is discharged to an outside of the DC relay 1000 through a fixed contact 1110*b* on the left.

At this time, the permanent magnets 1200 are disposed at the outside of the fixed contacts 1110*a* and 1110*b*, respectively, to generate magnetic fields.

Referring to FIG. 2, directions of flows of current and force generated by the magnetic fields are shown. That is, the current is applied to the right fixed contact 1110*a* as illustrated in (a) of FIG. 1.

In addition, a right permanent magnet 1200*a* is arranged so that an S pole is located inward, and a left permanent magnet 1200*b* is arranged so that an N pole is located inward. Accordingly, the magnetic field is generated in a direction from the left to the right.

According to the Fleming's left-hand rule, electromagnetic force, magnetic field, and current are generated at right angles. Accordingly, the electromagnetic force is generated in a direction A by the current application and the arrangement of the permanent magnets 1200. As a result, arc is extinguished while moving in the direction A. Conversely, when current is applied to the left fixed contact 1110*b*, the electromagnetic force is generated in a direction B.

At this time, the electromagnetic forces generated by the permanent magnets 1200 are inversely proportional to the square of a distance between the permanent magnets 1200. Accordingly, when the distance between the permanent magnets 1200 increases, the electromagnetic forces that are insufficient to form an arc extinguishing path may be generated.

In addition, strength of the magnetic fields generated by the permanent magnets 1200 is affected by size and thickness of the permanent magnets 1200. However, considering a limited space inside the DC relay 1000, it is difficult to increase the size and thickness of the permanent magnet 1200 indefinitely.

Therefore, such space limitation causes lots of limits in designing the size and thickness of the permanent magnets 1200 and the distance between the permanent magnets 1200. Therefore, a method for ensuring magnetic force between the permanent magnets 1200 is required.

Also, referring to FIG. 3, a direction of driving force for moving the movable core 1320 in response to application of control power is illustrated. At this time, attractive force generated between the fixed core 1310 and the movable core 1320 should be greater than elastic force generated due to compression of a return spring 1130 and the spring 1321.

However, there may be a case in which sufficient attractive force is not generated between the fixed core 1310 and the movable core 1320 due to factors such as a use environment and the like. This results from that moving force of the movable core 1320 depends solely on electromagnetic attractive force between the fixed core 1310 and the movable core 1320.

Therefore, a method for sufficiently securing electromagnetic attractive force generated between the fixed core 1310 and the movable core 1320 is required.

Korean Patent Registration No. 10-1216824 discloses a DC relay including a damping magnet. Specifically, the document discloses a DC relay having a damping magnet that is provided below a movable contact to cancel a magnetic flux induced around the movable contact in order to prevent the movable contact from being arbitrarily separated from a fixed contact when the DC relay is in an ON state.

However, this type of DC relay has a limitation in that there is no consideration on formation of a magnetic flux for extinguishing arc. That is, the arbitrary separation between the contacts can be prevented, but a method for extinguishing arc generated and a method for securing an extinguishing path are not disclosed. In addition, the document does not suggest a method for securing magnetic force between permanent magnets.

Korean Patent Registration No. 10-1661396 discloses a DC relay having a structure capable of maintaining permanent magnets at desired positions. Specifically, the document discloses an electromagnetic relay having a structure capable of maintaining positions of permanent magnets by arranging a first plate member and a second plate member around the permanent magnets to support the permanent magnets.

However, this type of electromagnetic relay can maintain the positions of the permanent magnets, but there is a limitation in that any method for changing a direction of a magnetic flux formed by the permanent magnets.

Those types of relays also fail to suggest a method for enhancing driving force for moving the movable contact. In addition, polarities of permanent magnets cause inconvenience in that power source and load applied to fixed contacts are limited in specific directions.

Korean Patent Registration No. 10-1216824 (Dec. 28, 2012)

Korean Patent Registration No. 10-1661396 (Sep. 29, 2016)

SUMMARY

The present disclosure is directed to providing a DC relay having a structure capable of solving those problems and other drawbacks.

First, one aspect of the present disclosure is to provide a DC relay having a structure capable of sufficiently reinforcing (enhancing) strength of magnetic fields generated in an inner space.

Another aspect of the present disclosure is to provide a DC relay having a structure capable of enhancing strength of magnetic fields without excessively changing arrangement of components.

Still another aspect of the present disclosure is to provide a DC relay having a structure capable of generating sufficient magnetic fields without changing positions of permanent magnets provided in an inner space or increasing a size or thickness of the permanent magnets.

Still another aspect of the present disclosure is to provide a DC relay having a structure capable of configuring various moving directions of arc extinguished inside the DC relay.

Still another aspect of the present disclosure is to provide a DC relay having a structure in which a direction of current applied to a fixed contact is not limited according to polarity of a permanent magnet.

Still another aspect of the present disclosure is to provide a DC relay having a structure capable of enhancing driving force for moving a movable contact.

Still another aspect of the present disclosure is to provide a DC relay having a structure capable of reducing magnitude of control power applied to move a movable contact.

In order to achieve these and other advantages and in accordance with the purpose of this specification, as embodied and broadly described herein, there is provided a Direct Current (DC) relay that may include a fixed contactor, a movable contact extending in a longitudinal direction and having one side located adjacent to the fixed contactor to be brought into contact with or separated from the fixed contactor, a plurality of magnet members located adjacent to both end portions of the fixed contactor in the longitudinal direction, respectively, to generate magnetic fields, and a magnetic force reinforcing member located between the plurality of magnet members to form magnetic fields together with the plurality of magnet members.

The magnetic force reinforcing member of the DC relay may be located on another side of the fixed contactor opposite to the one side of the fixed contactor.

The fixed contactor of the DC relay may include a first fixed contactor biased toward one side from a center of the fixed contactor in the longitudinal direction, and a second fixed contactor biased toward another side opposite to the one side from the center of the fixed contactor in the longitudinal direction.

The magnetic force reinforcing member of the DC relay may be located between the first fixed contactor and the second fixed contactor in the longitudinal direction of the fixed contactor.

One of the first fixed contactor or the second fixed contactor may be electrically connected to an external power supply, and another one of the first fixed contactor and the second fixed contactor may be electrically connected to an external load.

The plurality of magnet members of the DC relay may include a first magnet member located adjacent to one end portion of the fixed contactor in the longitudinal direction, and a second magnet member located adjacent to another end portion of the fixed contactor opposite to the one end portion of the fixed contactor in the longitudinal direction.

One side of the first magnet member and one side of the second magnet member facing each other may have the same polarity.

One side of the magnetic force reinforcing member of the DC relay facing the fixed contactor may have polarity different from that of each one side of the first magnet member and the second magnet member.

Directions of the magnetic fields generated by the first magnet member, the second magnet member, and the magnetic force reinforcing member of the DC relay may be one of a first direction from the first magnet member and the second magnet member toward the magnetic force reinforcing member, and a second direction from the magnetic force reinforcing member toward the first magnet member and the second magnet member.

According to another implementation of the present disclosure, there is provided a Direct Current (DC) relay that may include a fixed contactor, a fixed contactor having one side to be brought into contact with or separated from the fixed contactor, a fixed core located at another side opposite to the one side of the fixed contactor to be magnetized when control power is applied, a movable core located at another side of the fixed core opposite to the one side of the fixed core adjacent to the fixed contactor, so as to be moved toward the fixed core when the control power is applied, and a magnetic force reinforcing member located between the fixed contactor and the fixed core to apply attractive force to the movable core in a direction toward the fixed core.

The direct current relay may further include coils disposed to surround the fixed core and the movable core to generate an electromagnetic field when the control power is applied, and the fixed core may be magnetized by the electromagnetic field generated by the coils.

The fixed core may apply attractive force to the movable core in a direction toward the fixed core when the fixed core is magnetized, and the magnetic force reinforcing member may apply attractive force to the movable core in a direction toward the magnetic force reinforcing member.

According to still another implementation of the present disclosure, there is provided a Direct Current (DC) relay that may include a fixed contactor, a fixed contactor having one side located adjacent to the fixed contactor to be brought into contact with or separated from the fixed contactor so as to be electrically connected to or disconnected from the fixed contactor, a shaft extending in a longitudinal direction, and connected to the fixed contactor so as to be movable toward or away from the fixed contactor together with the fixed contactor, a fixed core located adjacent to another side of the fixed contactor opposite to the one side of the fixed contactor, having the shaft inserted therethrough, and magnetized when control power is applied, a movable core located at another side of the fixed core opposite to the one side of the fixed core adjacent to the fixed contactor to be moved toward the fixed core when the control power is applied, and connected with the shaft, and a magnetic force reinforcing member located between the fixed core and the fixed contactor, having the shaft movably coupled therethrough, and configured to apply attractive force to the movable core.

The direct current relay may further include a plurality of magnet members located adjacent to both end portions of the fixed contactor in the longitudinal direction, respectively, to generate magnetic fields therebetween, and the magnetic force reinforcing member may generate magnetic fields together with the plurality of magnet members.

One side of each of the plurality of magnet members facing each other may have the same polarity, and one side of the magnetic force reinforcing member facing the fixed contactor may have a different polarity from that of the one side of each of the plurality of magnet members.

The magnetic force reinforcing member may have a cylindrical shape extending in the longitudinal direction. A hollow portion may be formed through a center of the magnetic force reinforcing member in the longitudinal direction, and the shaft may be coupled through the hollow portion.

According to the present disclosure, the following effects can be achieved.

First, a magnetic force reinforcing member provided between permanent magnets may reinforce magnetic fields generated by the permanent magnets.

Accordingly, the magnetic fields generated inside the DC relay can be sufficiently reinforced.

The magnetic force reinforcing member may be fitted through a shaft. The magnetic force reinforcing member fitted through the shaft may be located above a fixed core.

This may allow the magnetic force reinforcing member to be simply coupled. In addition, the magnetic force reinforcing member for intensifying strength of the magnetic fields can be provided without excessively changing an internal structure of the DC relay.

The magnetic force reinforcing member can reinforce the magnetic fields generated by the permanent magnets. That is, the magnetic force reinforcing member may be located to generate a magnetic field in the same direction as the magnetic fields generated by the permanent magnets.

Therefore, the magnetic fields can be sufficiently generated without changing positions of the permanent magnets or increasing a size or thickness of the permanent magnets to increase the magnetic forces of the permanent magnets.

In addition, the magnetic fields may be generated inside the DC relay in a direction toward or away from the magnetic force reinforcing member, other than a direction from one of the permanent magnets to the other. That is, directions of magnetic fields generated around fixed contacts, respectively, may be different from each other.

Accordingly, the magnetic fields can be generated in various directions inside the DC relay, and thus arc extinguishing directions can also be diversified.

In addition, the magnetic fields may be generated inside the DC relay in a direction to converge on the magnetic force reinforcing member or a direction to be discharged from the magnetic force reinforcing member. Therefore, based on each fixed contact, arc can receive electromagnetic forces in the same direction.

Even if a direction of current applied to the fixed contact is changed, arc can be induced to be extinguished in the same direction. Thus, since the user does not need to connect the DC relay according to polarities, user convenience can be improved.

The magnetic force reinforcing member may be located adjacent to the fixed core. When the fixed core is magnetized by an electromagnetic field generated as current flows on coils, the magnetic force reinforcing member can also apply attractive force to the movable core.

Therefore, compared to the case where the movable core receives attractive force only by the fixed core, the attractive force applied to the movable core can be increased. As a result, the movable core and the fixed contactor connected to the movable core can be moved smoothly when control power is applied.

In addition, even when control power of the same magnitude is applied, the attractive force applied to the movable core by the magnetic force reinforcing member can be increased.

Therefore, even if the magnitude of the control power for moving the movable core is decreased, the movable core can be moved smoothly, and thus a quantity of power required for driving the DC relay can be reduced.

9, when the S pole is formed at the upper side of the magnetic force reinforcing member.

Figure 9:
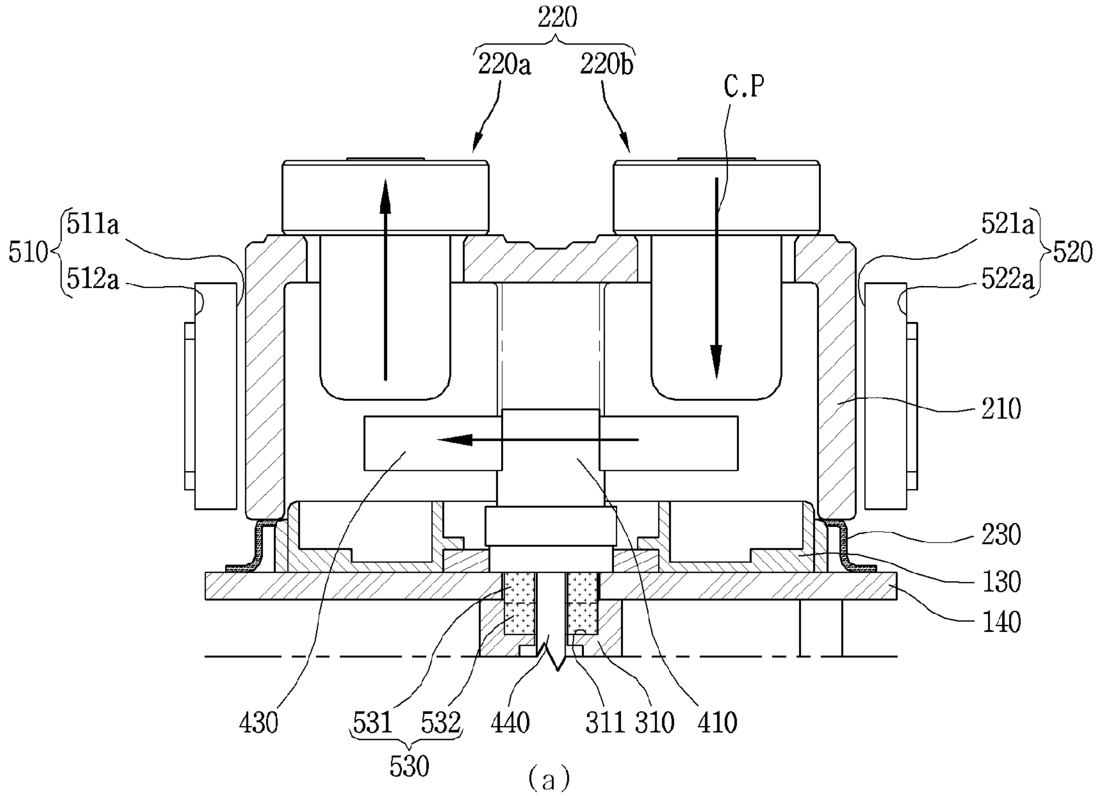
FIG. 9 is a cutout view illustrating a state in which current flows in the DC relay of FIG. 4.
Figure 9:
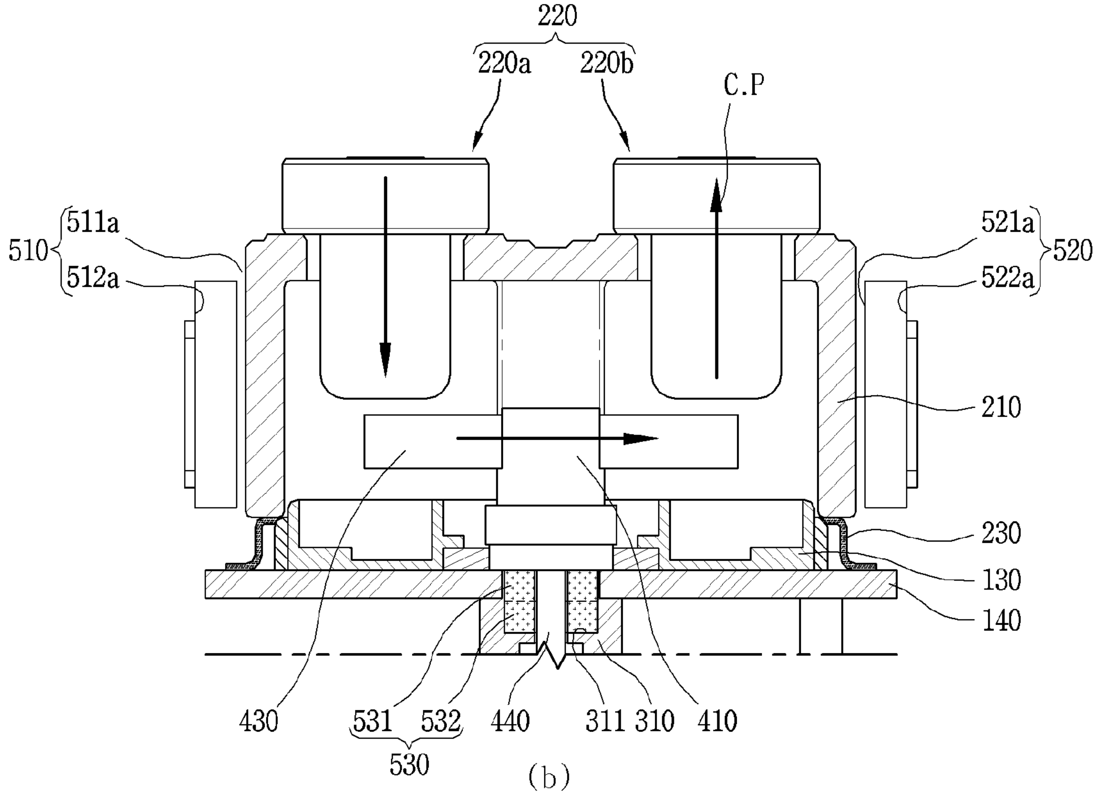
Figure 11:
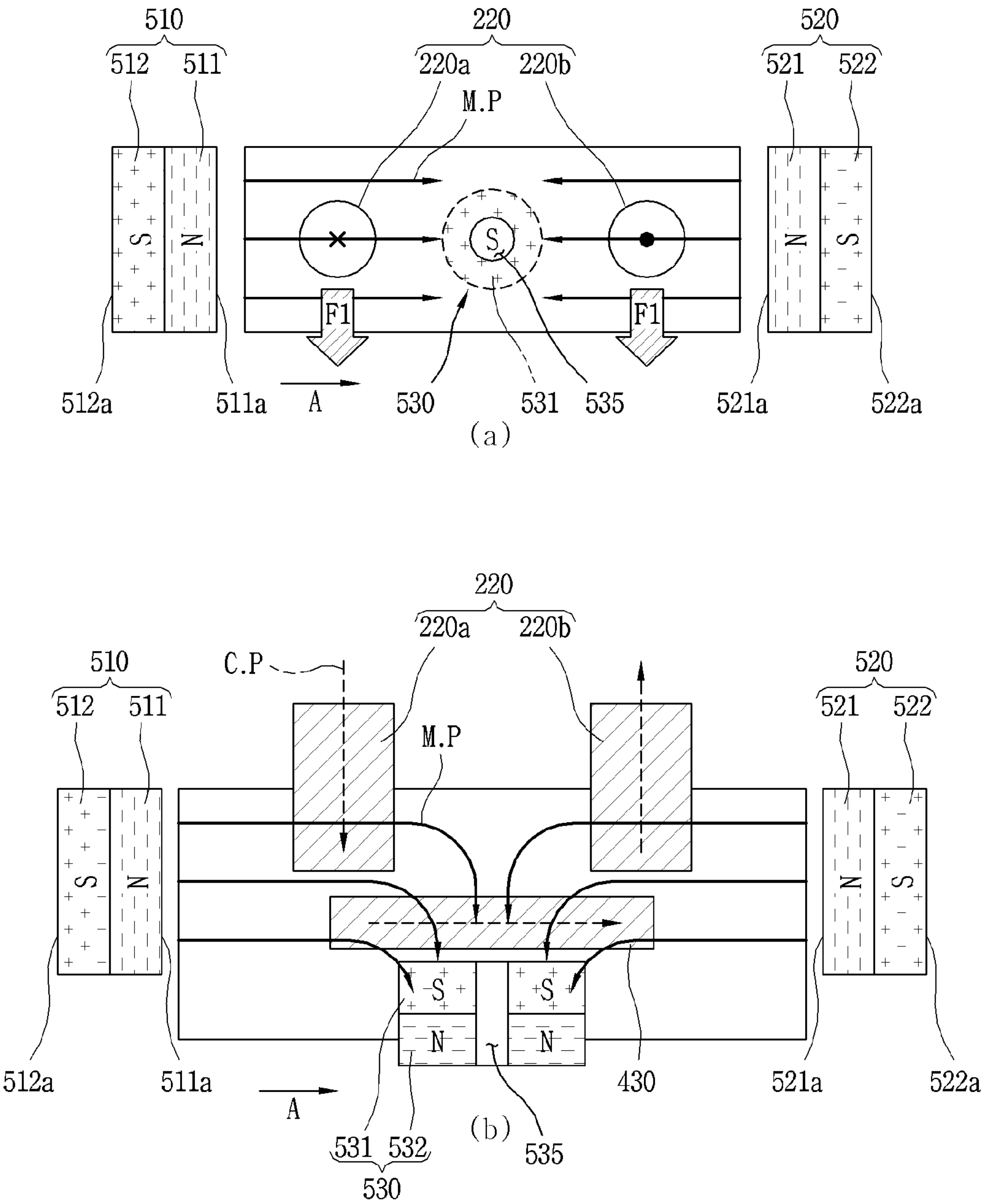

FIG. 11 is a planar view (a) and a cross-sectional view (b) illustrating a direction of a magnetic path formed, in response to the flow of current as illustrated in (b) of FIG. 9, when the S pole is formed at the upper side of the magnetic force reinforcing member.

Figure 12:
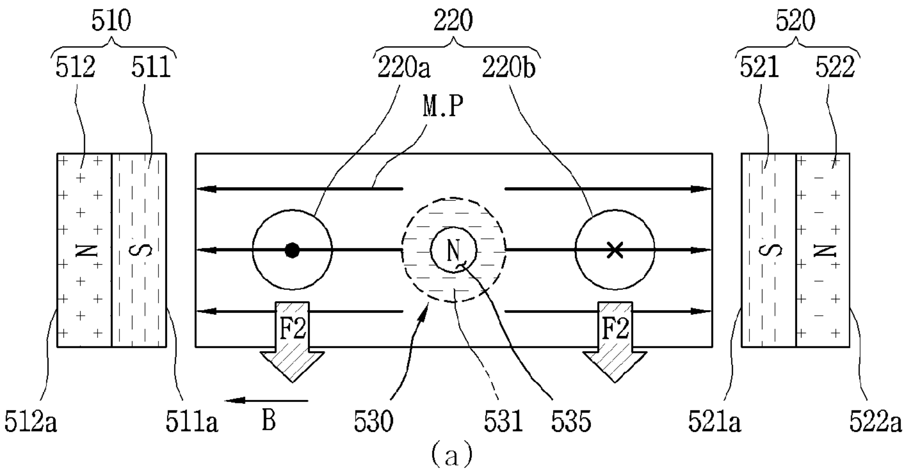
Figure 12:
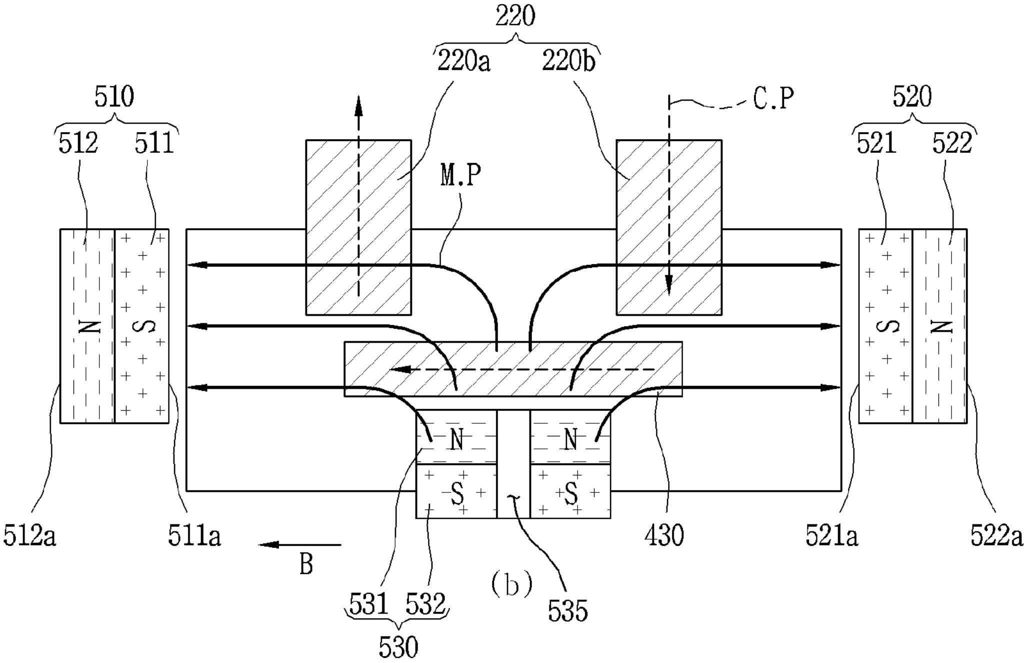

FIG. 12 is a planar view (a) and a cross-sectional view (b) illustrating a direction of a magnetic path formed, in response to the flow of current as illustrated in (a) of FIG. 9, when the N pole is formed at the upper side of the magnetic force reinforcing member.

Figure 13:
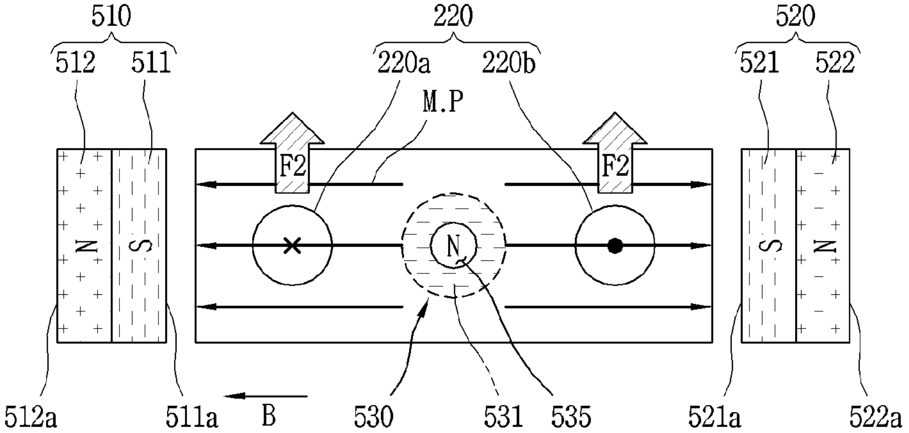
Figure 13:
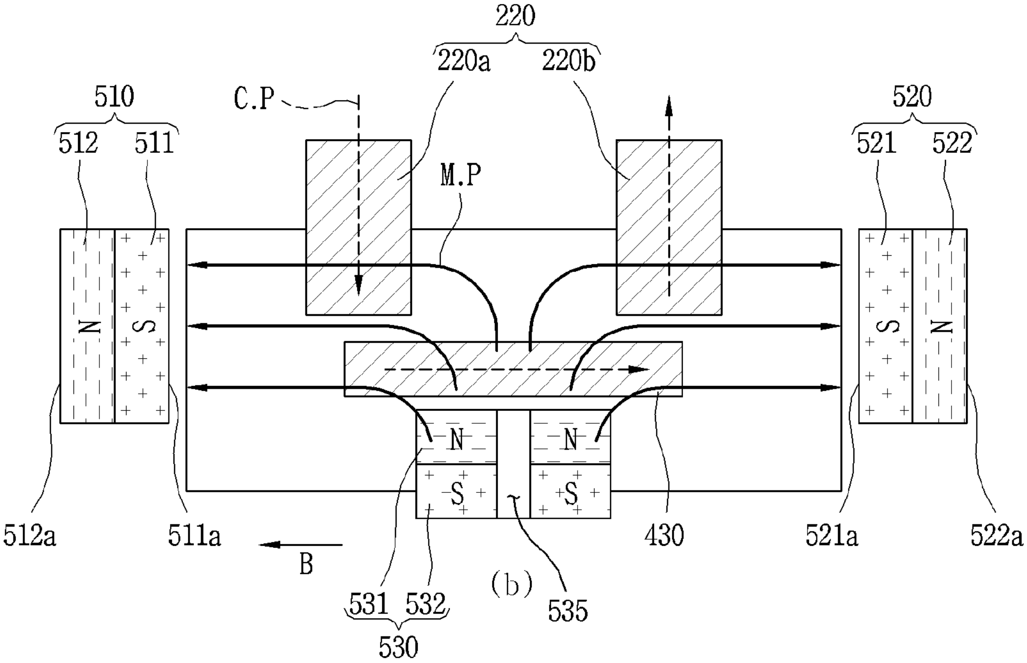

FIG. 13 is a planar view (a) and a cross-sectional view (b) illustrating a direction of a magnetic path formed, in response to the flow of current as illustrated in (b) of FIG. 9, when the N pole is formed at the upper side of the magnetic force reinforcing member.

Figure 1:
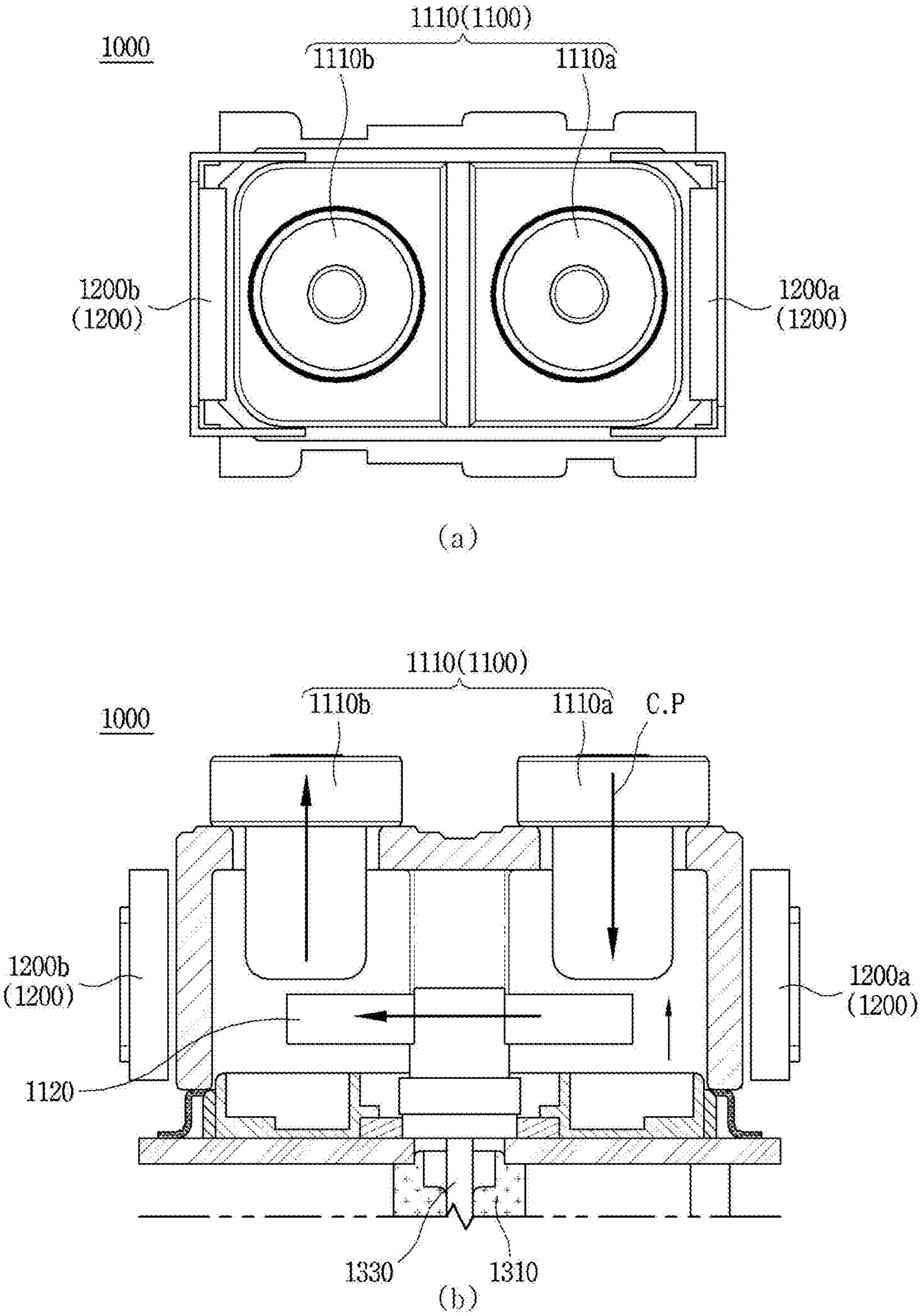
FIG. 1 (Prior Art)
FIG. 1 is a planar view (a) and a cutout view (b) illustrating a structure of a DC relay according to the related art.
Figure 2:
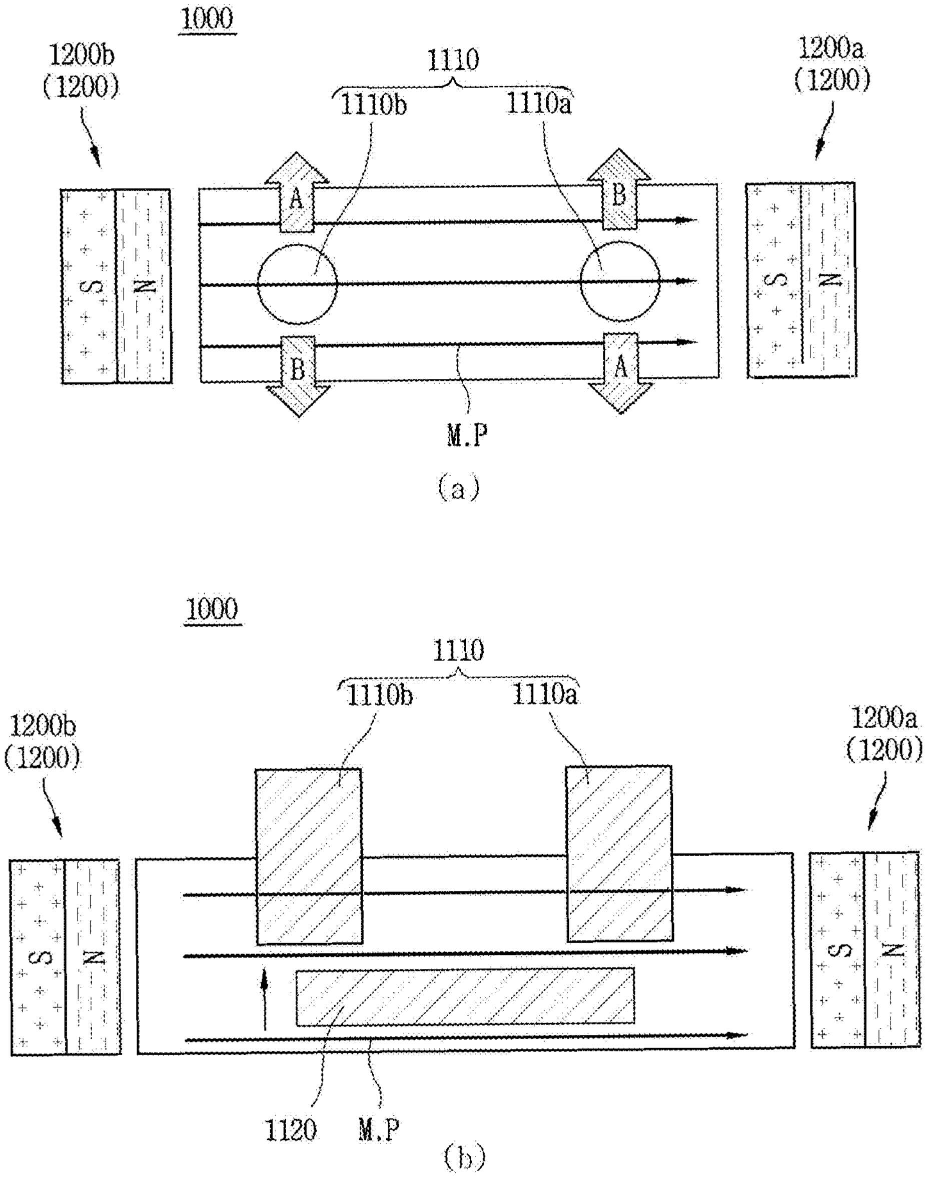
FIG. 2 (Prior Art)
FIG. 2 is a planar view (a) and a cross-sectional view (b) illustrating a formation direction of magnetic field and a movement direction of arc when current is applied to the DC relay according to the related art.
Figure 3:
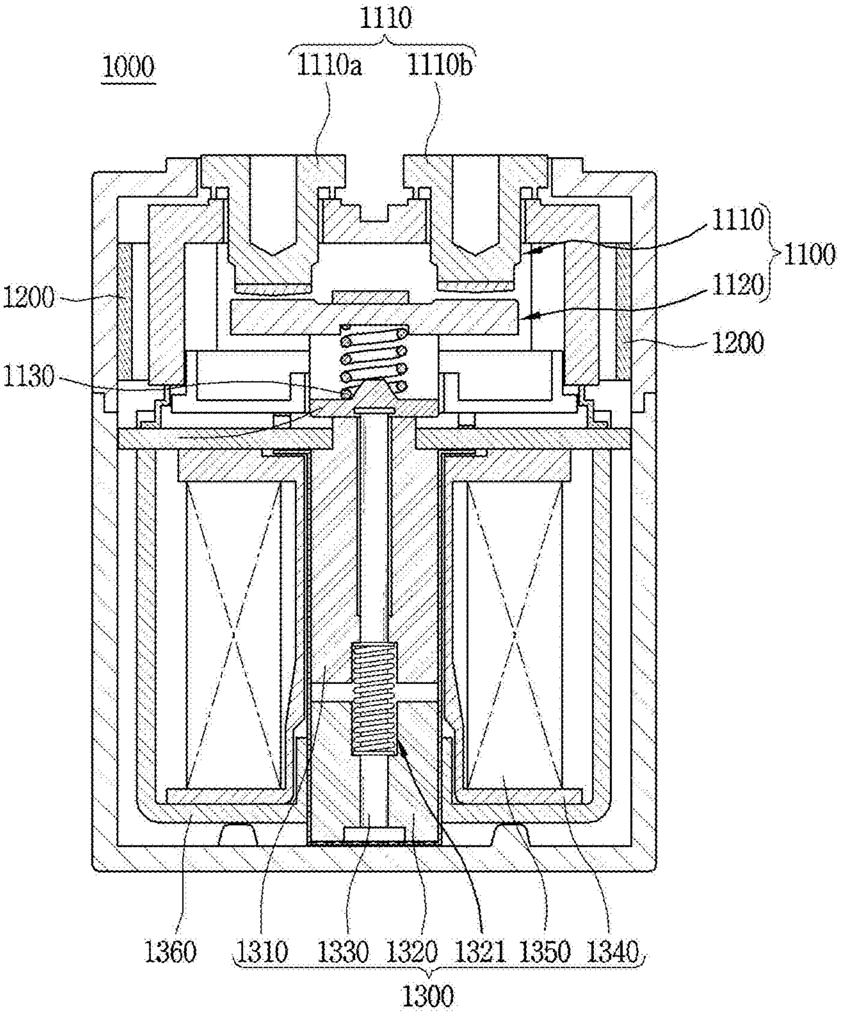
FIG. 3 (Prior Art)
FIG. 3 is a cross-sectional view illustrating a magnetic path (circuit) formed in the DC relay according to the related art.
Figure 4:
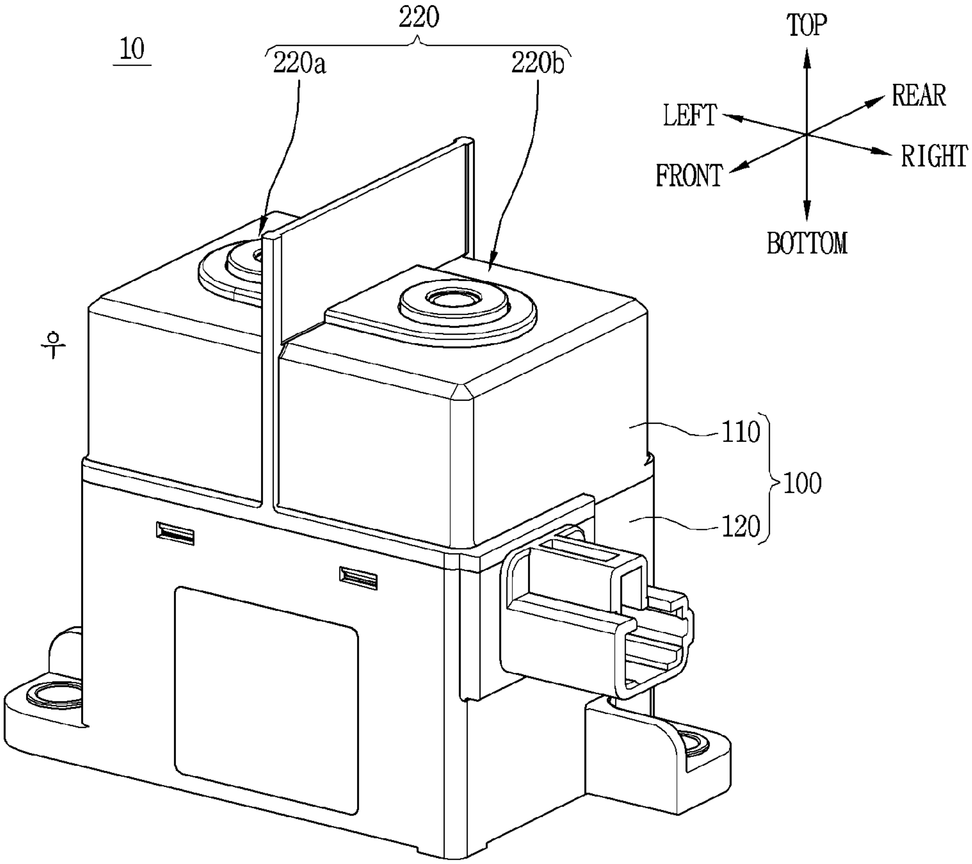
FIG. 4 is a perspective view of a DC relay in accordance with an implementation of the present disclosure.
Figure 14:
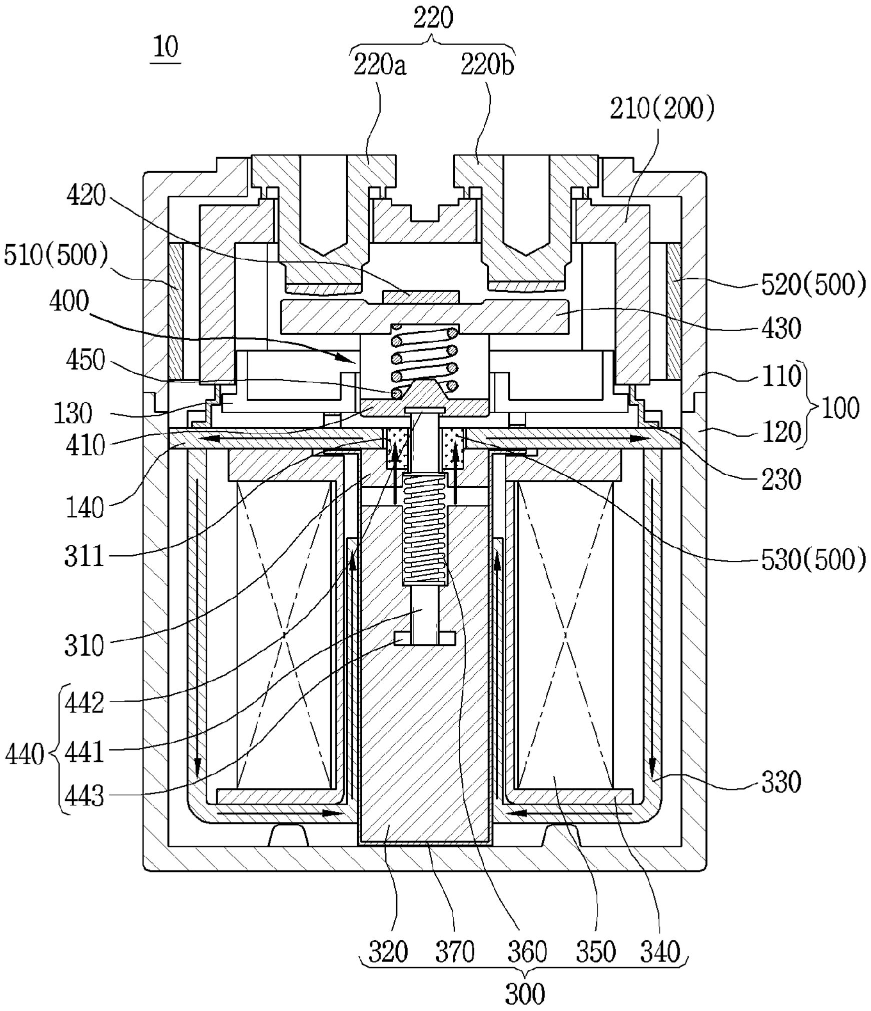

FIG. 14 is a planar view illustrating a magnetic path formed by the magnetic force reinforcing member in a core part located in a lower side of the DC relay of FIG. 4.

DETAILED DESCRIPTION

Hereinafter, a DC relay 10 according to an implementation of the present disclosure will be described in detail with reference to the accompanying drawings.

In the following description, descriptions of some components may be omitted to help understanding of the present disclosure.

1. Definition of Terms

It will be understood that when an element is referred to as being "connected with" another element, the element can be connected with the another element or intervening elements may also be present.

In contrast, when an element is referred to as being "directly connected with" another element, there are no intervening elements present.

A singular representation used herein may include a plural representation unless it represents a definitely different meaning from the context.

The term "magnetize" used in the following description refers to a phenomenon in which an object exhibits magnetism in a magnetic field.

The term "polarities" used in the following description refers to different properties belonging to an anode and a cathode of an electrode. In one implementation, the polarities may be classified into an N pole or an S pole.

The terms "left", "right", "top", "bottom", "front" and "rear" used in the following description will be understood based on a coordinate system illustrated in FIGS. 4 and 5.

2. Description of Configuration of DC Relay 10 According to Implementation

Figure 5:
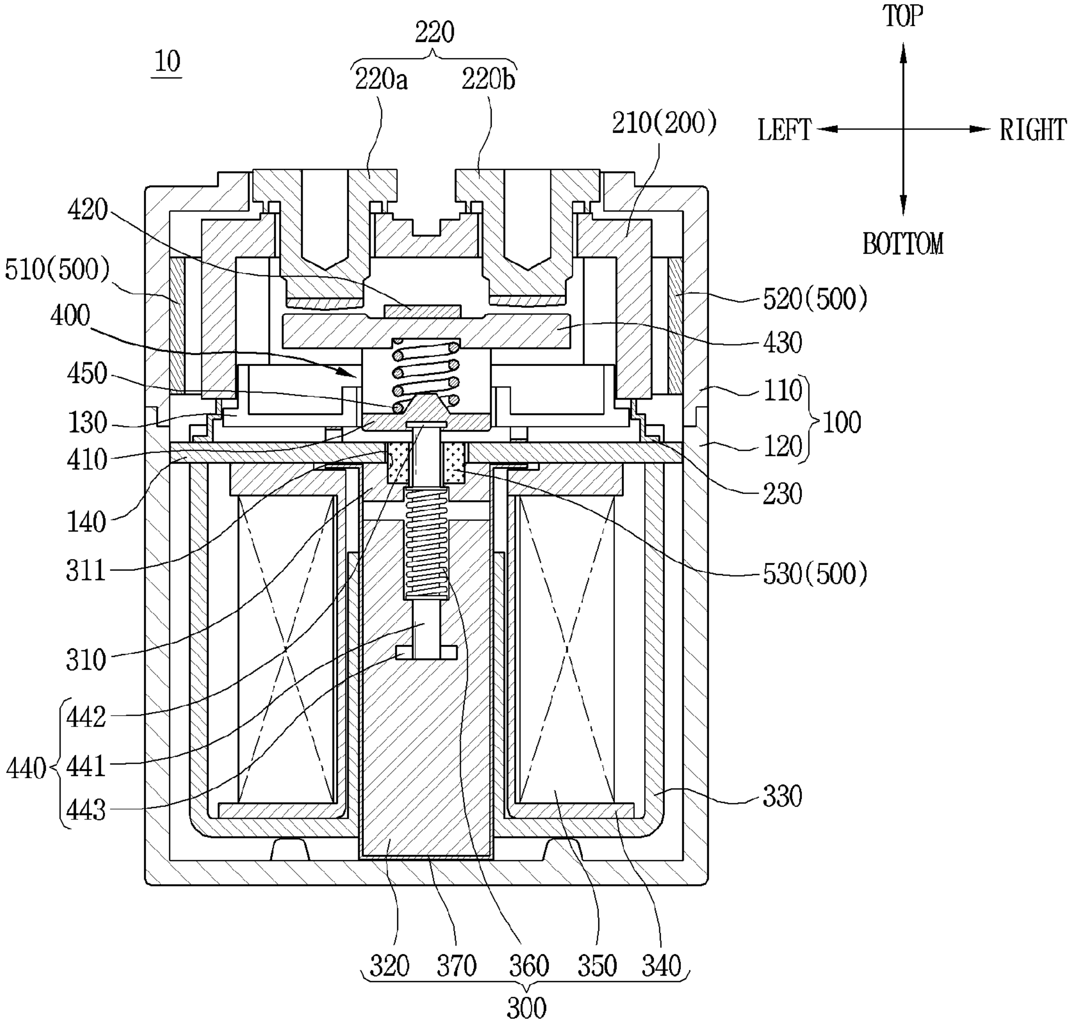
FIG. 5 is a cross-sectional view of the DC relay of FIG. 4.
Figure 6:
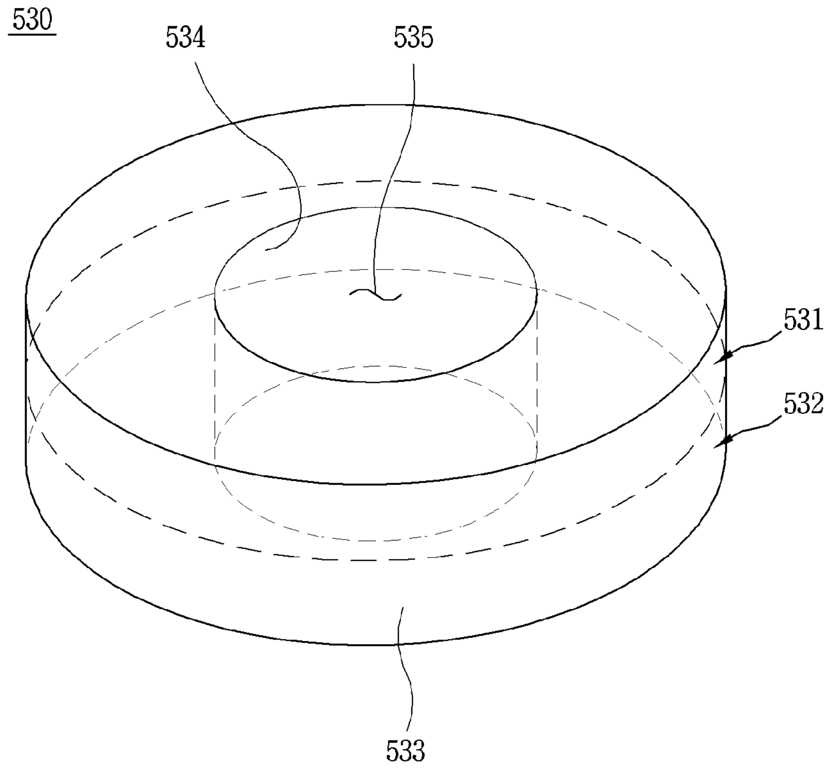
FIG. 6 is a perspective view illustrating a magnetic field reinforcing member provided in the DC relay of FIG. 4.
Figure 7:
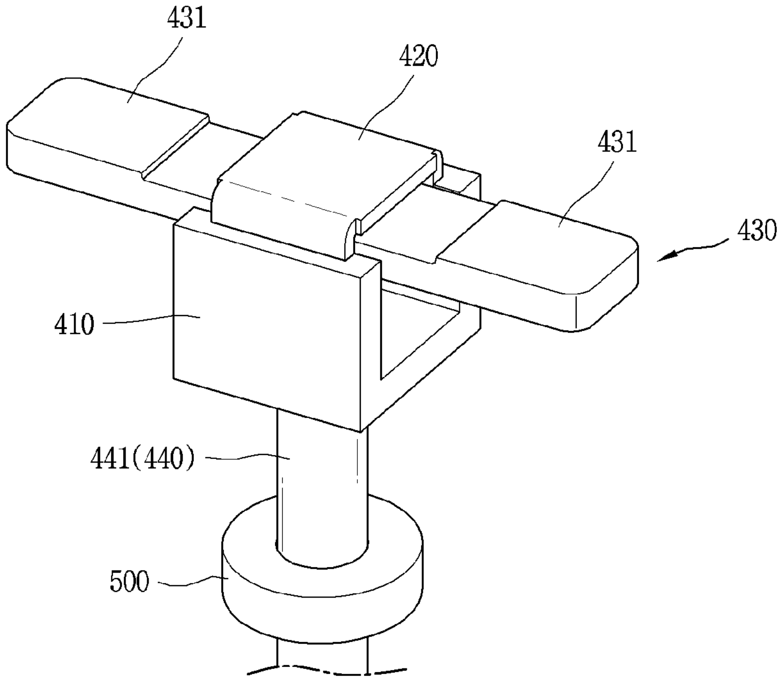
FIG. 7 is a perspective view illustrating a state in which the magnetic force reinforcing member provided in the DC relay of FIG. 4 is coupled to a shaft.

Referring to FIGS. 4 and 5, a DC relay 10 according to an implementation of the present disclosure may include a frame part (or frame unit) 100, an opening/closing part 300, a core part 400, and a movable contactor part 400.

In addition, the DC relay 10 according to the implementation of the present disclosure may include a magnetic force generating part (or magnetism forming unit) 500 for forming a path for extinguishing generated arc and increasing driving force for the movable core 320.

Hereinafter, the DC relay 10 according to the implementation of the present disclosure will be described with reference to FIGS. 4 and 5, and the magnetic force generating part 500 will be described as a separate clause.

(1) Description of Frame Part 100

The frame part (or frame unit) 100 may define appearance of the DC relay 10. A predetermined space may be defined inside the frame part 100. Various devices for the DC relay 10 to perform functions for applying or cutting off current may be accommodated in the space. That is, the frame part 100 may function as a kind of housing.

The frame part 100 may be formed of an insulating material such as synthetic resin. This may prevent inside and outside of the frame part 100 from being arbitrarily electrically connected to each other.

The frame part 100 may include an upper frame 110, a lower frame 120, an insulating plate 130, and a supporting plate 140.

The upper frame 110 may define an upper side of the frame part 100. The opening/closing part 200 and the movable contactor part 400 may be accommodated in an inner space of the upper frame 110.

The upper frame 110 may be coupled to the lower frame 120. The insulating plate 130 and the supporting plate 140 may be interposed between the upper frame 110 and the lower frame 120. The insulating plate 130 and the supporting plate 140 may electrically and physically isolate the inner space of the upper frame 110 and an inner space of the lower frame 120 from each other.

A fixed contactor 220 of the opening/closing part 200 may be provided on one side of the upper frame 110, for example, on an upper side of the upper frame 110 in the illustrated implementation. The fixed contactor 220 may be partially exposed to the upper side of the upper frame 110, to be electrically connected to an external power supply or a load.

The lower frame 120 may define a lower side of the frame part 100. The core part 300 may be accommodated in the inner space of the lower frame 120.

The lower frame 120 may be coupled to the upper frame 110. The insulating plate 130 and the supporting plate 140 may be interposed between the lower frame 120 and the upper frame 110. The insulating plate 130 and the supporting plate 140 may electrically and physically isolate the inner space of the lower frame 120 and the inner space of the upper frame 110 from each other.

The insulating plate 130 may be located between the upper frame 110 and the lower frame 120. The insulating plate 130 may allow the magnetizes upper frame 110 and the lower frame 120 to be electrically spaced apart from each other.

This may result in preventing arbitrary electric connection between the opening/closing part 200 and the movable contactor part 400 accommodated in the upper frame 110 and the core part 300 accommodated in the lower frame 120.

A through hole (not shown) may be formed through a central portion of the insulating plate 130. A shaft 440 of the movable contactor part 400 may be coupled through the through hole (not shown) to be movable up and down.

The insulating plate 130 may be supported by the supporting plate 140.

The supporting plate 140 may be located between the upper frame 110 and the lower frame 120. The supporting plate 140 may allow the magnetizes upper frame 110 and the lower frame 120 to be electrically spaced apart from each other.

In addition, the support plate 140 may be located on a lower side of the insulating plate 130 to support the insulating plate 130.

For example, the supporting plate 140 may be formed of a magnetic material. In addition, the supporting plate 140 can configure a magnetic circuit together with a yoke 330 of the core part 300. The magnetic circuit may apply driving force to the movable core 320 of the core part 300 so as to move toward the fixed core 310.

A through hole (not shown) may be formed through a central portion of the supporting plate 140. The shaft 440 may be coupled through the through hole (not shown) to be movable up and down.

Therefore, when the movable core 320 is moved toward or away from the fixed core 310, the shaft 440 and the movable contactor 430 connected to the shaft 440 may also be moved in the same direction.

(2) Description of Opening/Closing Part 200

The opening/closing unit 200 may make current applied or cut off to the DC relay 10 according to an operation of the core part 300. Specifically, the opening/closing part 200 may allow or block an application of current as the fixed contactor 220 and the movable contactor 430 are brought into contact with or separated from each other.

The opening/closing part 200 may be accommodated in the upper frame 110. The opening/closing part 200 may be electrically and physically spaced apart from the core part 300 by the insulating plate 130 and the supporting plate 140.

The opening/closing part 200 may include an arc chamber 210, a fixed contactor 220, and a sealing member 230. Also, as will be described later, a first magnet member 510 and a second magnet member 520 of the magnetic force generating part 500 may be accommodated in the opening/closing part 200.

The plurality of magnets 510 and 520 may generate a magnetic field inside the arc chamber 210 to control shape and discharge path of arc generated. A detailed description thereof will be given later.

The arc chamber 210 may be configured to extinguish arc generated as the fixed contactor 220 and the movable contactor 430 are separated from each other. Therefore, the arc chamber 210 may also be referred to as an "extinguishing portion".

The arc chamber 210 may hermetically accommodate the fixed contactor 220 and the movable contactor 430. That is, the fixed contactor 220 and the movable contactor 430 may be completely accommodated in the arc chamber 210. Accordingly, the arc generated when the fixed contactor 220 and the movable contactor 430 are separated from each other may not arbitrarily leak to the outside of the arc chamber 210.

The arc chamber 210 may be filled with extinguishing gas. The extinguishing gas may extinguish the arc and may be discharged to the outside of the DC relay 10 through a preset path.

The arc chamber 210 may be formed of an insulating material. In addition, the arc chamber 210 may be formed of a material having high pressure resistance and high heat resistance. This is because the generated arc is a flow of electrons of high-temperature and high-pressure. In one implementation, the arc chamber 210 may be formed of a ceramic material.

A plurality of through holes (not shown) may be formed through an upper side of the arc chamber 210. The fixed contactor 220 may be coupled through each of the through holes (not shown). In the illustrated implementation, the fixed contactor 220 may be provided by two, namely, a first fixed contactor 220*a* and a second fixed contactor 220*b*. Accordingly, the through holes (not shown) formed through the upper side of the arc chamber 210 may also be provided by two.

When the fixed contactor 220 is coupled through the through hole (not shown), the through hole (not shown) may be sealed. That is, the fixed contactor 220 may be hermetically coupled to the through hole (not shown). Accordingly, generated arc may not be externally discharged through the through hole (not shown).

A lower side of the arc chamber 210 may be open. The insulating plate 130 may come in contact with the lower side of the arc chamber 210. In addition, the sealing member 230 may come in contact with the lower side of the arc chamber 210. That is, the lower side of the arc chamber 210 may be sealed by the insulating plate 130 and the sealing member 230. Accordingly, the arc chamber 210 may be electrically and physically isolated from an outer space of the upper frame 110.

In other words, the arc chamber 210 may be sealed by the insulating plate 130, the supporting plate 140, the fixed contactor 220, the sealing member 230, and a housing 410 of the movable contactor part 400.

The arc extinguished in the arc chamber 210 may be discharged to the outside of the DC relay 10 through a preset path.

The fixed contactor 220 may be brought into contact with or separated from the movable contactor 430, so as to electrically connect or disconnect the inside and the outside of the DC relay 10.

Specifically, when the fixed contactor 220 is brought into contact with the movable contactor 430, the inside and the outside of the DC relay 10 may be electrically connected. On the other hand, when the fixed contactor 220 is separated from the movable contactor 430, the electric connection between the inside and the outside of the DC relay 10 may be released.

As the name implies, the fixed contactor 220 does not move. That is, the fixed contactor 220 may be fixedly coupled to the upper frame 110 and the arc chamber 210. Accordingly, the contact and separation between the fixed contactor 220 and the movable contactor 430 can be implemented by the movement of the movable contactor 430.

One end portion of the fixed contactor 220, for example, an upper end portion in the illustrated implementation, may be exposed to the outside of the upper frame 110. A power supply or a load may be electrically connected to the one end portion.

The fixed contactor 220 may be provided in plurality. In the illustrated implementation, the fixed contactor 220 may be provided by two including a first fixed contactor 220*a* on a left side and a second fixed contactor 220*b* on a right side.

The first fixed contactor 220*a* may be located to be biased to one side from a center of the movable contactor 430 in the longitudinal direction, namely, to the left in the illustrated implementation. Also, the second fixed contactor 220*b* may be located to be biased to another side from the center of the movable contactor 430 in the longitudinal direction, namely, to the right in the illustrated implementation.

A power supply may be electrically connected to any one of the first fixed contactor 220*a* and the second fixed contactor 220*b*. Also, a load may be electrically connected to another one of the first fixed contactor 220*a* and the second fixed contactor 220*b*.

The DC relay 10 according to the implementation of the present disclosure may be operated regardless of the polarity of the fixed contactor 220. That is, a power supply or a load may be electrically connected to any one of the first fixed contactor 220*a* and the second fixed contactor 220*b*. This may result from a direction a magnetic field generated inside the arc chamber 210, and a detailed description thereof will be described later.

Another end portion of the fixed contactor 220, for example, a lower end portion in the illustrated implementation may extend toward the movable contactor 430. When the movable contactor 430 is moved toward the fixed contactor 220, namely, upward in the illustrated implementation, the lower end portion of the fixed contactor 220 may be brought into contact with the movable contactor 430. Accordingly, the outside and the inside of the DC relay 10 can be electrically connected.

The lower end portion of the fixed contactor 220 may be located inside the arc chamber 210. That is, the another end portion of the fixed contactor 220 may also be sealed by the arc chamber 210.

When control power is cut off, the movable contactor 430 may be separated from the fixed contactor 220 by elastic force of a return spring 360. At this time, as the fixed contactor 220 and the movable contactor 430 are separated from each other, arc may be generated between the fixed contactor 220 and the movable contactor 430. The generated arc may be extinguished by extinguishing gas inside the arc chamber 210 and discharged to the outside.

In this case, a path through which the arc is discharged may be changed according to a direction of a magnetic field generated inside the arc chamber 210 and a direction of current applied through the fixed contactor 220. A detailed description thereof will be given later.

The sealing member 230 may block communication between the arc chamber 210 and an inner space of the upper frame 110. The sealing member 230 may seal the lower side of the arc chamber 210 together with the insulating plate 130 and the supporting plate 140.

In detail, an upper side of the sealing member 230 may be coupled to the lower side of the arc chamber 210. A radially inner side of the sealing member 230 may be coupled to an outer circumference of the insulating plate 130, and a lower side of the sealing member 230 may be coupled to the supporting plate 140.

Accordingly, arc generated in the arc chamber 210 and arc extinguished by the extinguishing gas may not flow into the inner space of the upper frame 110.

In addition, the sealing member 230 may prevent an inner space of a cylinder 370 from communicating with the inner space of the frame part 100.

(3) Description of Core Part 300

The core part 300 may allow the movable contactor part 400 to move upward as control power is applied. In addition, when the control power is not applied any more, the core part 300 may allow the movable contactor part 400 to move downward again.

The core part 300 may be electrically connected to the outside of the DC relay 10. The core part 300 may receive control power from the outside through the connection.

The movable core 300 may be located below the opening/closing part 200. The core part 300 may be accommodated in the lower frame 120. The core part 300 and the opening/closing part 200 may be electrically and physically spaced apart from each other by the insulating plate 130 and the supporting plate 140.

The movable contactor part 400 may be located between the core part 300 and the opening/closing part 200. The movable contactor part 400 may be moved by driving force applied by the core part 300. Accordingly, the movable contactor 430 and the fixed contactor 220 may be brought into contact with each other so that the DC relay 10 can be electrically connected.

The core part 300 may include a fixed core 310, a movable core 320, a yoke 330, a bobbin 340, a coil 350, a return spring 360, and a cylinder 370.

The fixed core 310 may be magnetized by electromagnetic force generated in the coils 350 so as to generate electromagnetic attractive force. The movable core 320 may be moved toward the fixed core 310 (upward in the illustrated implementation) by the attractive force generated by the fixed core 310.

The fixed core 310 may not move. That is, the fixed core 310 may be fixedly coupled to the supporting plate 140 and the cylinder 370.

The fixed core 310 may be implemented as any member that can be magnetized by electromagnetic force. In one implementation, the fixed core 310 may be implemented as a permanent magnet or an electromagnet.

The fixed core 310 may be partially accommodated in an upper space inside the cylinder 370. Further, an outer circumference of the fixed core 310 may come in contact with an inner circumference of the cylinder 370.

The fixed core 310 may be located between the supporting plate 140 and the movable core 320.

A through hole (not shown) may be formed through a central portion of the fixed core 310. The shaft 440 may be coupled through the through hole (not shown) to be movable up and down.

The fixed core 310 may be spaced apart from the movable core 320 by a predetermined distance. Accordingly, a distance by which the movable core 320 can move toward the fixed core 310 may be limited to the distance between the fixed core 310 and the movable core 320. Accordingly, the predetermined distance may be defined as a "moving distance of the movable core 320".

A recessed portion 311 may be formed in a central portion of the fixed core 310 by a predetermined distance. Specifically, the recessed portion 311 may be recessed by the predetermined distance into one surface of the fixed core 310 facing the supporting plate 140.

A magnetic force reinforcing member (or magnetism strengthening member) 530 of the magnetic force generating part 500 may be accommodated in the recessed portion 311. Accordingly, recessed distance and shape of the recessed portion 311 may preferably be determined according to height and shape of the magnetic force reinforcing member 530.

The recessed portion 311 may extend radially outward from the through hole (not shown) formed through the central portion of the fixed core 310. The recessed portion 311 may be formed to have the same central axis as the through hole (not shown).

One end portion of the return spring 360, namely, a lower end portion in the implementation may be brought into contact with the lower side of the fixed core 310. When the movable core 320 is moved upward as the fixed core 310 is magnetized, the return spring 360 may be compressed and store restoring force.

Accordingly, when the magnetization of the fixed core 310 is finished, the movable core 320 may be moved downward again.

When control power is applied, the movable core 320 may be moved toward the fixed core 310 by electromagnetic attractive force generated by the fixed core 310.

As the movable core 320 is moved, the shaft 440 coupled to the movable core 320 may be moved toward the fixed core 310, namely, upward in the illustrated implementation. In addition, as the shaft 440 is moved, the movable contactor part 400 coupled to the shaft 440 may be moved upward.

Accordingly, the fixed contactor 220 and the movable contactor 430 may be brought into contact with each other so that the DC relay 10 can be electrically connected to external power supply and load.

The movable core 320 may have any shape capable of receiving attractive force by electromagnetic force. In one implementation, the movable core 320 may be formed of a magnetic material or implemented as a permanent magnet or an electromagnet.

The movable core 320 may be accommodated inside the cylinder 370. Also, the movable core 320 may be moved in the longitudinal direction of the cylinder 370 inside the cylinder 370.

Specifically, the movable core 320 may be moved toward the fixed core 310 (upward in the illustrated implementation) and away from the fixed core 310 (downward in the illustrated implementation).

The movable core 320 may be coupled to the shaft 440. The movable core 320 may move integrally with the shaft 440. When the movable core 320 moves upward or downward, the shaft 440 may also move upward or downward.

The movable core 320 may be located below the fixed core 310. The movable core 320 may be spaced apart from the fixed core 310 by a predetermined distance. The predetermined distance may be defined as the moving distance of the movable core 320, as aforementioned.

A predetermined space may be defined inside the movable core 320. Specifically, the movable core 320 may extend in a longitudinal (lengthwise) direction, and a hollow portion may be recessed into the movable core 320 in the longitudinal direction by a predetermined distance (depth).

The return spring 360 and the shaft 440 coupled through the return spring 360 may be partially accommodated in the hollow portion.

Specifically, the hollow portion may accommodate a portion, adjacent to the movable core 320, of a shaft body portion 441 of the shaft 440, and a shaft tail portion 443 of the shaft 440.

The yoke 330 may form a magnetic circuit as control power is applied. The magnetic circuit formed by the yoke 330 may control a direction of the electromagnetic field generated by the coils 350.

Accordingly, when control power is applied, the coils 350 may generate an electromagnetic field in a direction in which the movable core 320 moves toward the fixed core 310. The yoke 330 may be formed of a conductive material capable of allowing electrical connection.

The yoke 330 may be accommodated inside the lower frame 120. The yoke 330 may surround the coils 350. The coils 350 may be accommodated in the yoke 330 with being spaced apart from an inner circumferential surface of the yoke 330 by a predetermined distance.

Also, the bobbin 340 may be accommodated in the yoke 330. That is, the yoke 330, the coils 350, and the bobbin 340 on which the coils 350 are wound may be sequentially located radially inward from an outer circumference of the lower frame 120.

An upper side of the yoke 330 may come in contact with the supporting plate 140. In addition, the outer circumference of the yoke 330 may come in contact with an inner circumference of the lower frame 120 or may be located to be spaced apart from the inner circumference of the lower frame 120 by a predetermined distance.

As will be described later, the DC relay 10 according to the implementation of the present disclosure may include a magnetic force reinforcing member 530. The magnetic force reinforcing member 530 may strengthen (reinforce, enhance) a magnetic circuit formed by the yoke 330. A detailed description thereof will be given later.

The coils 350 may be wound around the bobbin 340. The bobbin 340 may be accommodated inside the yoke 330.

The bobbin 340 may include upper and lower portions formed in a flat shape, and a cylindrical pole portion extending in the longitudinal direction to connect the upper and lower portions. That is, the bobbin 34 may have a bobbin shape.

An upper portion of the bobbin 340 may come in contact with the lower side of the supporting plate 140. In addition, a lower portion of the bobbin 340 may be supported by a protrusion protruding from the lower side to the upper side of the lower frame 120.

The coils 350 may be wound around the pole portion of the bobbin 340. A wound thickness of the coils 350 may be the same as a diameter of the upper and lower portions of the bobbin 340.

A hollow portion may be formed through the pole portion of the bobbin 340 extending in the longitudinal direction. The cylinder 370 may be accommodated in the hollow portion.

The pole portion of the bobbin 340 may be disposed to have the same central axis as the fixed core 310, the movable core 320, and the shaft 440.

The coils 350 may generate an electromagnetic field as control power is applied. The fixed core 310 may be magnetized by the electromagnetic field generated by the coils 350 and thus apply attractive force to the movable core 320.

The coils 350 may be wound around the bobbin 340. Specifically, the coils 350 may be wound around the pole portion part of the bobbin 340 and stacked on a radial outside of the pole portion. The coils 350 may be accommodated inside the yoke 330.

When control power is applied, the coils 350 may generate an electromagnetic field. In this case, strength and direction of the electromagnetic field generated by the coils 350 may be controlled by the yoke 330. The fixed core 310 may be magnetized by the electromagnetic field generated by the coils 350.

When the fixed core 310 is magnetized, the movable core 320 may receive electromagnetic force, namely, attractive force in a direction toward the fixed core 310. Accordingly, the movable core 320 may be moved toward the fixed core 310, namely, upward in the illustrated implementation.

The return spring 360 may apply driving force for the movable core 320 to be moved away from the fixed core 310 when control power is not applied any more after the movable core 320 is moved to the fixed core 310.

The return spring 360 may be compressed and store restoring force as the movable core 320 is moved toward the fixed core 310.

At this time, the restoring force stored by the return spring 360 may preferably be smaller than the attractive force exerted by the magnetized fixed core 310 to the movable core 320. Accordingly, while control power is applied, the movable core 320 may not be returned to its original position by the return spring 360.

As will be described later, the DC relay 10 according to the implementation of the present disclosure may include the magnetic force reinforcing member 530. The magnetic force reinforcing member 530 may apply electromagnetic force to the movable core 320 together with the fixed core 310.

Therefore, in the implementation, the restoring force stored by the return spring 360 may preferably be greater than the attractive force exerted by the magnetic force reinforcing member 530 to the movable core 320, but smaller than the sum of the attractive force exerted by the magnetized fixed core 310 to the movable core 320 and the attractive force exerted by the magnetic force reinforcing member 530 to the movable core 320.

When control power is not applied any more, only the restoring force by the return spring 360 may be applied to the movable core 320. Accordingly, the movable core 320 can be moved away from the fixed core 310 to be returned to the original position.

The return spring 360 may be provided in any form capable of storing restoring force by being compressed in response to the movement of the movable core 320. In one implementation, the return spring 360 may be configured as a coil spring.

A shaft 440 may be coupled through the return spring 360. The shaft 440 may move up and down regardless of the return spring 360 in a coupled state to the return spring 360. That is, the shaft 440 may serve to support the return spring 360.

The return spring 360 may be accommodated in the hollow portion formed through the inside of the movable core 320. In addition, one end portion of the return spring 360 facing the fixed core 310, namely, an upper end portion in the illustrated implementation may be supported with coming in contact with a lower surface of the fixed core 310.

In addition, one end portion of the return spring 360 facing the fixed core 31, namely, an upper end portion in the illustrated implementation may be supported with coming in contact with a lower surface of the magnetic force reinforcing member 530.

The cylinder 370 may accommodate the fixed core 310, the movable core 320, and the return spring 360. Inside the cylinder 370, the movable core 320 may be moved upward and downward.

The cylinder 370 may be located in the hollow portion formed through the pole portion of the bobbin 340. An upper end portion of the cylinder 370 may come in contact with a lower surface of the supporting plate 140. In addition, a side surface of the cylinder 370 may come in contact with an inner circumferential surface of the pole portion of the bobbin 340, and an upper opening of the cylinder 370 may be sealed by the fixed core 310. A lower surface of the cylinder 370 may come in contact with an inner circumferential surface of the lower frame 120.

The cylinder 370 may accommodate the shaft 440. Inside the cylinder 370, the shaft 440 may be moved upward or downward together with the movable core 320.

(4) Description of Movable Contactor Part 400

The movable contactor part 400 may include the movable contactor 430 and components for moving the movable contactor 430. The movable contactor part 400 may allow the DC relay 10 to be electrically connected to external power supply and load.

The movable contactor part 400 may be accommodated in the frame part 100, specifically, in the inner space of the upper frame 110. In detail, the movable contactor part 400 may be accommodated in the arc chamber 210 within the upper frame 110.

The fixed contactor 220 may be located above the movable contactor part 400. The movable contactor part 400 may be accommodated in the arc chamber 210 to be movable toward and away from the fixed contactor 220 (i.e., movable up and down in the illustrated implementation).

The core part 300 may be located below the movable contactor part 400. The movable contactor part 400 may be accommodated to be movable toward and away from the fixed contactor 220 (i.e., movable up and down in the illustrated implementation), in response to the movement of the movable core 320.

The movable contactor part 400 may include the movable contactor 430. The movable contactor 430 may be brought into contact with or separated from the fixed contactor 220 in response to the movement of the movable core 320 of the core part 300.

In the illustrated implementation, the movable contactor part 400 may include a housing 410, a cover 420, a movable contactor 430, a shaft 440, and an elastic portion 450.

Also, although not illustrated, the movable contactor part 400 may include a yoke (not illustrated) for preventing the movable contactor 430 from being arbitrarily separated from the fixed contactor 220. The yoke (not illustrated) may cancel the electromagnetic repulsive force generated between the fixed contactor 220 and the movable contactor 430.

The housing 410 may accommodate the movable contactor 430 and the elastic portion 450 elastically supporting the movable contactor 430.

In the illustrated implementation, the housing 410 may be formed such that one side and another side opposite to the one side are open. The movable contactor 430 may be inserted through the openings.

In the illustrated implementation, the housing 410 may include a base defining a lower surface, and side surfaces protruding from both ends of the base toward the fixing contacts 220, respectively. When the movable contactor 430 is inserted, the side surfaces of the housing 410 may surround the movable contactor 430.

The cover 420 may be provided on a top of the housing 410. The cover 420 may cover an upper surface of the movable contactor 430 accommodated in the housing 410.

The housing 410 and the cover 420 may preferably be formed of an insulating material to prevent unexpected electrical connection. In one implementation, the housing 410 and the cover 420 may be formed of synthetic resin or the like.

A bottom of the housing 410 may be connected to the shaft 440. When the movable core 320 connected to the shaft 440 is moved upward or downward, the housing 410 may also be moved upward or downward.

The housing 410 and the cover 420 may be coupled by arbitrary members. In one implementation, the housing 410 and the cover 420 may be coupled by a coupling member (not illustrated) such as a bolt and a nut.

In this case, the cover 420 may be fitted to the housing 410. To this end, grooves (not illustrated) may be recessed in upper end portions of the both side surfaces of the housing 410, and protrusions (not illustrated) to be inserted into the grooves may be formed on the cover 420.

The movable contactor 430 may come in contact with the fixed contactor 220 when control power is applied, so that the DC relay 10 can be electrically connected to external power supply and load. When control power is not applied, the movable contactor 430 may be separated from the fixed contactor 220 such that the DC relay 10 can be electrically disconnected from the external power supply and load.

The movable contactor 430 may be located adjacent to the fixed contactor 220.

An upper side of the movable contactor 430 may be covered by the cover 420. In one implementation, the upper side of the movable contactor 430 may come in contact with one surface of the cover 420 facing the movable contactor 430, namely, a lower surface in the illustrated implementation.

A lower side of the movable contactor 430 may be elastically supported by the elastic portion 450. In order to prevent the movable contactor 430 from being arbitrarily moved downward, the elastic portion 450 may elastically support the movable contactor 430 in a restored state to some extent after being compressed.

Accordingly, when the elastic portion 450 applies elastic force to the movable contactor 430 in a direction toward the cover 420, the movable contactor 430 may be stably maintained in a contact state with the fixed contactor 220.

The movable contactor 430 may extend in the longitudinal direction, namely, in left and right directions in the illustrated implementation. That is, a length of the movable contactor 430 may be longer than its width.

Accordingly, when the movable contactor 430 is accommodated in an inner space of the housing 410, both end portions of the movable contactor 430 in the longitudinal direction may be exposed to the outside of the housing 410. Contact protrusions 431 may protrude from the both end portions.

The contact protrusions 431 of the movable contactor 430 may be portions brought into contact with the fixed contactor 220. The contact protrusions 431 may protrude by a predetermined distance from one surface of the movable contactor 430 facing the fixed contactor 220, namely, from an upper surface in the illustrated implementation.

In the illustrated implementation, the fixed contactor 220 may include a first fixed contactor **220*a* on a left side and a second fixed contactor 220*b* on a right side. Accordingly, the contact protrusions 431 may be formed on end portions of the movable contactor 430 corresponding to positions of the respect fixed contacts 220**.

The contact protrusions 431 can reduce a distance by which the movable contactor 430 has to be moved to come into contact with the fixed contactor 220.

Other portions of the movable contactor 430, except for the contact protrusions 431, may not come into contact with the fixed contactor 220. Since the contact protrusions 431 protrude from the movable contactor 430, the contact protrusions 431 of the movable contactor 430 may be portions closest to the fixed contactor 220.

A width of the movable contactor 430 may be the same as a spaced distance between the side surfaces of the housing 410. That is, when the movable contactor 430 is accommodated in the housing 410, both side surfaces of the movable contactor 430 in a width direction may be brought into contact with inner sides of the side surfaces of the housing 410.

Accordingly, the state where the movable contactor 430 is accommodated in the housing 410 can be stably maintained.

The shaft 440 may transmit driving force, which is generated in response to the operation of the core part 300, to the movable contactor part 400. Specifically, the shaft 440 may be connected to the movable core 320 and the movable contactor 430. When the movable core 320 is moved upward or downward, the movable contactor 430 may be moved upward or downward.

The shaft 440 may extend in the longitudinal direction, namely, in the up and down (vertical) direction in the illustrated implementation.

The shaft 440 may be coupled to the movable core 320. When the movable core 320 is moved up and down, the shaft 440 may also be moved up and down together with the movable core 320.

The shaft 440 may be coupled to the housing 410. When the shaft 440 is moved up and down, the housing 410 may also be moved up and down together with the shaft 440.

The shaft 440 may be coupled through the fixed core 310 and the magnetic force reinforcing member 530 to be movable up and down. The shaft 440 may be inserted into the movable core 320. In addition, the return spring 360 may be fitted through the shaft 440.

The shaft 440 may include a shaft body portion 441, a shaft head portion 442, and a shaft tail portion 443.

The shaft body portion 441 may define the body of the shaft 440. In the illustrated implementation, the support body portion 441 may be formed in a cylindrical shape having a circular cross section and extending in the longitudinal direction.

The shaft head portion 442 may be located on one end portion of the shaft body portion 441 coupled to the housing 410, namely, on an upper end portion in the illustrated implementation. The shaft head portion 442 may be coupled to the housing 410. The shaft head portion 442 may be formed to have a larger diameter than the shaft body portion 441.

The shaft head portion 442 and the housing 410 may be integrally formed with each other. In one implementation, the shaft head portion 442 and the housing 410 may be formed through insert-injection molding.

The shaft tail portion 443 may be located on one end portion of the shaft body portion 441 inserted into the movable core 320, namely, on a lower end portion in the illustrated implementation. The shaft tail portion 443 may be coupled to the movable core 320. The shaft tail portion 443 may be formed to have a larger diameter than the shaft body portion 441.

The coupled states between the shaft 440 and the housing 410 and between the shaft 440 and the movable core 320 can be stably maintained by the shaft head portion 442 and the shaft tail portion 443.

The elastic portion 450 may elastically support the movable contactor 430. When the movable contactor 430 comes into contact with the fixed contactor 220, the movable contactor 430 may tend to be separated from the fixed contactor 220 by electromagnetic repulsive force.

At this time, the elastic portion 450 may elastically support the movable contactor 430 to prevent the movable contactor 430 from being arbitrarily separated from the fixed contactor 220.

The elastic portion 450 may be formed in any shape capable of being compressed or stretched to store restoring force and transmitting the stored restoring force to another member. In one implementation, the elastic portion 450 may be configured as a coil spring.

One end portion of the elastic portion 450 facing the movable contactor 430, namely, an upper end portion in the illustrated implementation, may come in contact with the lower side of the movable contactor 430. In addition, another end portion of the elastic portion 450 opposite to the one end portion, namely, an upper side of the housing 410 may come in contact with the upper side of the housing 410.

The elastic portion 450 may elastically support the movable contactor 430 in a state of storing the restoring force by being compressed by a predetermined length. Accordingly, even if electromagnetic repulsive force is generated between the movable contactor 430 and the fixed contactor 220, the movable contactor 430 and the fixed contact 430 may not be separated from each other by the elastic portion 450.

A protrusion (not illustrated) to which the elastic portion 450 can be fitted may protrude from the lower side of the movable contactor 430 to enable stable coupling of the elastic portion 450. Similarly, a protrusion (not illustrated) to which the elastic portion 450 can be fitted may protrude from the top of the housing 410.

3. Description of Magnetic Force Generating Part 500 Provided in DC Relay 10 According to Implementation Referring back to FIG. 5, the DC relay 10 according to the implementation may include a magnetic force generating part (or magnetism forming unit) 500.

The magnetic force generating part 500 may generate a magnetic field for forming a movement path of arc generated inside the arc chamber 210. In addition, the magnetic force generating part 500 may increase driving force for moving the movable core 320 toward the fixed core 310 as control power is applied.

Hereinafter, the magnetic force generating part 500 provided in the DC relay 10 according to the implementation will be described with reference to FIGS. 5 to 9.

In the illustrated implementation, the magnetic force generating part 500 may include a first magnet member 510, a second magnet member 520, and a magnetic force reinforcing member 530.

The first magnet member 510 may generate a magnetic field that forms a path for extinguishing arc generated inside the arc chamber 210.

Specifically, arc may be generated when the fixed contactor 220 and the movable contactor 430 are separated from each other after current can flow in response to the movable contactor 430 being in contact with the fixed contactor 220.

In this case, the first magnet member 510 may generate a magnetic field in the arc chamber 210. The magnetic field generated by the first magnet member 510 and the current may generate electromagnetic force for guiding the arc. A direction of the electromagnetic force may be defined by the Fleming's left-hand rule.

In the illustrated implementation, the first magnet member 510 may be accommodated in the upper frame 110. In addition, the first magnet member 510 may be located at the left side outside the arc chamber 210. This may prevent the first magnet member 510 from being damaged due to the arc generated inside the arc chamber 210.

Also, the first magnet member 510 may come in contact with a left inner surface of the upper frame 110. The first magnet member 510 may be fixed to the inner surface of the upper frame 110. To this end, a fixing member (not illustrated) for fixing the first magnet member 510 may be provided.

In other words, the first magnet member 510 may be located adjacent to one end portion of the movable contactor 430 in the longitudinal direction, namely, a left end portion in the illustrated implementation.

The first magnet member 510 may be formed in any shape capable of generating a magnetic field. In one implementation, the first magnet member 510 may be implemented as a permanent magnet.

The magnetic field generated by the first magnet member 510 may be reinforced by the second magnet member 520 and the magnetic force reinforcing member 530.

Figure 10:
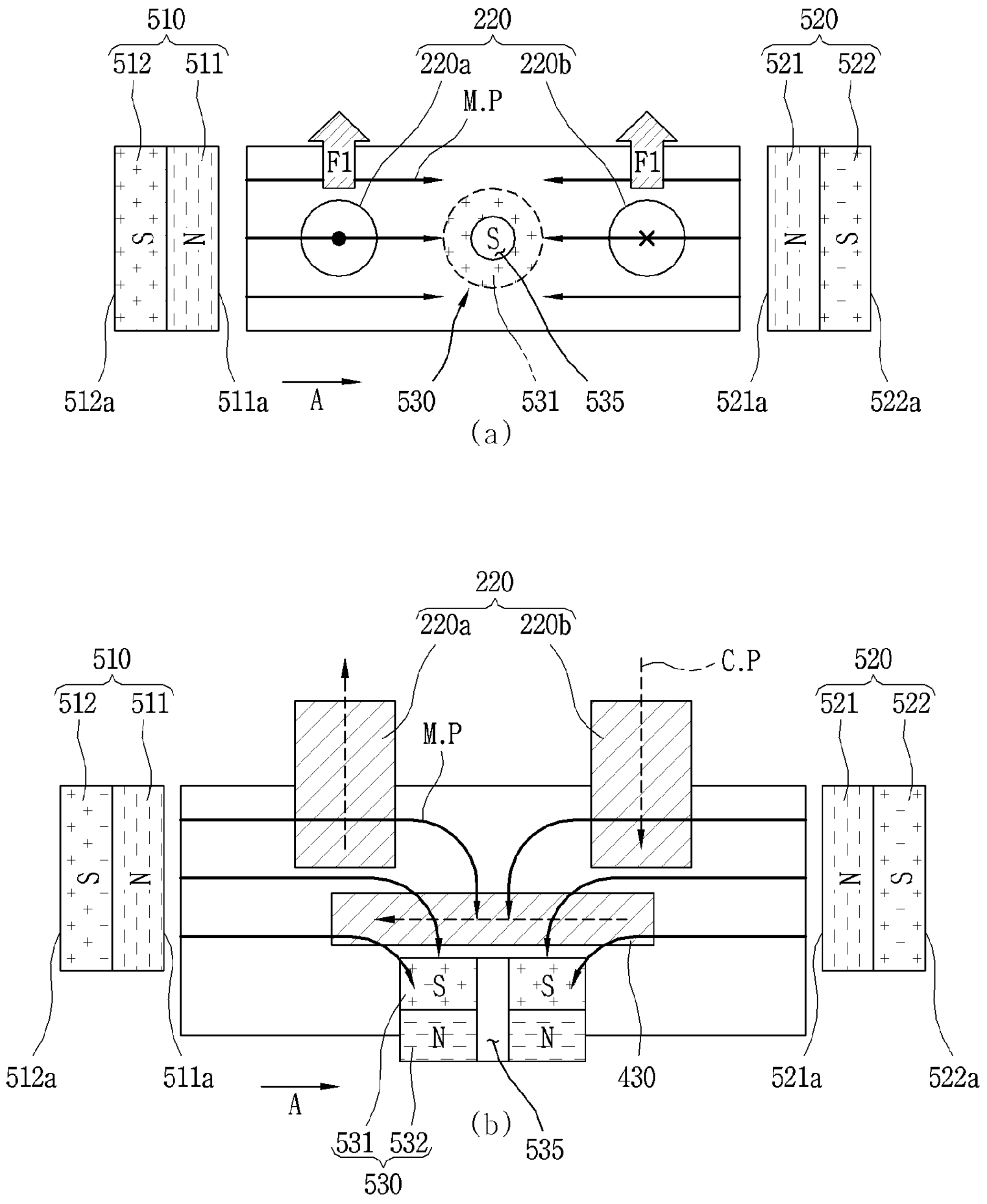
FIG. 10 is a planar view (a) and a cross-sectional view (b) illustrating a direction of a magnetic path formed, in response to the flow of current as illustrated in (a) of FIG.

Further referring to FIG. 10, the first magnet member 510 may include a first inner portion 511 and a first outer portion 512.

The first inner portion 511 may be defined as one side of the first magnet member 510 facing the fixed contactor 220. That is, if it is defined that the fixed contactor 220 is located at an inner side and the upper frame 110 is located at an outer side, the first inner portion 511 may be a portion of the first magnet member 510 facing the inner side.

One surface of the first inner portion 511 that is the closest to the fixed contactor 220 may be defined as a first inner surface 511*a*.

The first outer portion 512 may be defined as one side of the first magnet member 510 facing the inner surface of the upper frame 110. In other words, the first outer portion 512 may be defined as a portion of the first magnet member 510 opposite to the first inner portion 511.

One surface of the first outer portion 512 that is the closest to the inner surface of the upper frame 110 may be defined as a first outer surface 512*a*.

The first inner portion 511 and the first outer portion 512 may have different polarities. That is, when the first inner portion 511 has an N pole, the first outer portion 512 may have an S pole. On the other hand, when the first inner portion 511 has an S pole, the first outer portion 512 may have an N pole.

The second magnet member 520 may generate a magnetic field that forms a path for extinguishing arc generated inside the arc chamber 210.

Specifically, arc may be generated when the fixed contactor 220 and the movable contactor 430 are separated from each other after current flows in response to the movable contactor 430 being in contact with the fixed contactor 220.

In this case, the second magnet member 520 may generate a magnetic field in the arc chamber 210. The magnetic field generated by the second magnet member 520 and the current may generate electromagnetic force for guiding the arc. A direction of the electromagnetic force may be defined by the Fleming's left-hand rule.

In the illustrated implementation, the second magnet member 520 may be accommodated in the upper frame 110. In addition, the second magnet member 520 may be located at the right side outside the arc chamber 210. This may prevent the second magnet member 520 from being damaged due to the arc generated inside the arc chamber 210.

Also, the second magnet member 520 may come in contact with a right inner surface of the upper frame 110. The second magnet member 520 may be fixed to the inner surface of the upper frame 110. To this end, a fixing member (not illustrated) for fixing the second magnet member 520 may be provided.

In other words, the second magnet member 520 may be located adjacent to one end portion of the movable contactor 430 in the longitudinal direction, namely, a right end portion in the illustrated implementation.

The second magnet member 520 may be formed in any shape capable of generating a magnetic field. In one implementation, the second magnet member 520 may be implemented as a permanent magnet.

The magnetic field generated by the second magnet member 520 may be reinforced by the first magnet member 510 and the magnetic force reinforcing member 530.

Further referring to FIG. 10, the second magnet member 520 may include a second inner portion 521 and a second outer portion 522.

The second inner portion 521 may be defined as one side of the second magnet member 520 facing the fixed contactor 220. That is, if it is defined that the fixed contactor 220 is located at an inner side and the upper frame 110 is located at an outer side, the second inner portion 521 may be a portion of the second magnet member 520 facing the inner side.

One surface of the second inner portion 521 that is the closest to the fixed contactor 220 may be defined as a second inner surface 521*a*.

The second outer portion 522 may be defined as one side of the second magnet member 520 facing the inner surface of the upper frame 110. In other words, the second outer portion 522 may be defined as a portion of the second magnet member 520 opposite to the second inner portion 521.

One surface of the second outer portion 522 that is the closest to the inner surface of the upper frame 110 may be defined as a second outer surface 522*a*.

The second inner portion 521 and the second outer portion 522 may have different polarities. That is, when the second inner portion 521 has an N pole, the second outer portion 522 may have an S pole. On the other hand, when the second inner portion 521 has an S pole, the second outer portion 522 may have an N pole.

The first magnet member 510 and the second magnet member 520 may be spaced apart from each other with the arc chamber 210 interposed therebetween. The first inner portion 511 of the first magnet member 510 and the second inner portion 521 of the second magnet member 520 may be disposed to face each other.

The first inner portion 511 of the first magnet member 510 and the second inner portion 521 of the second magnet member 520 may have the same polarity. Likewise, the first outer portion 512 of the first magnet member 510 and the second outer portion 522 of the second magnet member 520 may have the same polarity.

In addition, the first inner portion 511 of the first magnet member 510 and the second inner portion 521 of the second magnet member 520 may have a different polarity from polarity of a first portion 531 of the magnetic force reinforcing member 530.

With the configuration, magnetic fields emitted from the first magnet member 510 and the second magnet member 520 may converge on the magnetic force reinforcing member 530. On the other hand, a magnetic field emitted from the magnetic force reinforcing member 530 may converge on the first magnet member 510 and the second magnet member 520. A detailed description thereof will be given later.

In the illustrated implementation, the first magnet member 510 and the second magnet member 520 may have a rectangular shape that has a rectangular cross section and extends in the longitudinal direction, namely, in the back and forth direction in the illustrated implementation. The first magnet member 510 and the second magnet member 520 may be formed in any shape capable of generating magnetic fields.

In addition, although not illustrated, additional magnet members for generating magnetic fields in the arc chamber 210 may be provided. The additional magnet members (not illustrated) may be provided at the front and the rear outside the arc chamber 210 to generate the magnetic fields.

The magnetic force reinforcing member 530 may reinforce the magnetic fields generated by the first magnet member 510 and the second magnet member 520. Accordingly, the electromagnetic forces generated by the current, which can flow in response to the electric connection between the fixed contactor 220 and the movable contactor 430, and the magnetic fields can be reinforced, thereby effectively forming an arc extinguishing path.

In addition, the magnetic force reinforcing member 530 may control a direction of the magnetic fields generated by the first magnet member 510 and the second magnet member 520. Accordingly, an external power supply and an external load can be arbitrarily electrically connected to the fixed contactor 220 without the need to maintain directionality.

That is, the power supply may be electrically connected to one of the first fixed contactor 220*a* and the second fixed contactor 220*b* and the load may be electrically connected to the other.

Furthermore, the magnetic force reinforcing member 530 may reinforce driving force for moving the movable core 320, which is generated as control power is applied to the core part 300. Accordingly, even when control power of a smaller magnitude is applied, a driving force sufficient to move the movable core 320 can be secured.

The magnetic force reinforcing member 530 may generate a magnetic field in the arc chamber 210. In addition, the magnetic force reinforcing member 530 may apply electromagnetic attractive force to the movable core 320.

The magnetic force reinforcing member 530 may be located below the lower side of the movable contactor part 400. Specifically, the magnetic force reinforcing member 530 may be located at the lower side of the housing 410 with being spaced apart from the housing 410 by a predetermined distance.

In other words, the magnetic force reinforcing member 530 may be located at another side opposite to one side of the movable contactor 430 adjacent to the fixed contactor 220.

Also, the magnetic force reinforcing member 530 may be located at the center of the movable contactor 430 in the longitudinal direction. As described above, the first fixed contactor 220*a* and the second fixed contactor 220*b* may be located to be biased from the center of the movable contactor 430 in the longitudinal direction of the movable contactor 430. Therefore, it may be said that the magnetic force reinforcing member 530 is located between the first fixed contactor 220*a* and the second fixed contactor 220*b*.

The magnetic force reinforcing member 530 may be inserted into the fixed core 310. Specifically, the magnetic force reinforcing member 530 may be inserted and seated in the recessed portion 311 of the fixed core 310.

The shaft 440 may be coupled through the magnetic force reinforcing member 530. The shaft 440 may be moved up and down while being coupled through the magnetic force reinforcing member 530. In this case, the magnetic force reinforcing member 530 may be maintained in an inserted state in the fixed core 310, irrespective of the movement of the shaft 440.

In the illustrated implementation, the magnetic force reinforcing member 530 may have a cylindrical shape with a hollow portion 535 formed therethrough in a height direction. The magnetic force reinforcing member 530 may be formed in any shape that is coupled to the fixed core 310 so as to reinforce magnetic fields and reinforce driving forces, as described above.

The magnetic force reinforcing member 530 may be formed in any shape capable of generating magnetic field and magnetic force. In one implementation, the magnetic force reinforcing member 530 may be implemented as a permanent magnet.

The magnetic force reinforcing member 530 may include a first portion 531, a second portion 532, an outer circumferential surface 533, an inner circumferential surface 534, and a hollow portion 535.

The first portion 531 may define an upper side of the magnetic force reinforcing member 530. The first portion 531 may be defined as one side of the magnetic force reinforcing member 530 facing the movable contactor 430.

The first portion 531 may have a predetermined polarity. In one implementation, the first portion 531 may have any one of N pole and S pole.

The second portion 532 may be located beneath the first portion 531. The second portion 532 may define a lower side of the magnetic force reinforcing member 530. The second portion 532 may be defined as one side of the magnetic force reinforcing member 530 facing the fixed core 310 or the movable core 320.

The second portion 532 may have a predetermined polarity. In one implementation, the second portion 532 may have any one of N pole and S pole.

The first portion 531 and the second portion 532 may be configured to have opposite polarities. That is, when the first portion 531 has an N pole, the second portion 532 may have an S pole. Conversely, when the first portion 531 has an S pole, the second portion 532 may have an N pole.

The first portion 531 may have a polarity opposite to that of the first inner portion 511 of the first magnet member 510 and the second inner portion 521 of the second magnet member 520. In other words, the second portion 532 may have the same polarity as the first inner portion 511 and the second inner portion 521.

The outer circumferential surface 533 may define a side surface of the magnetic force reinforcing member 530. In the illustrated implementation, the magnetic force reinforcing member 530 may have a cylindrical shape, and thus the outer circumferential surface 533 may be referred to as a side surface.

When the magnetic force reinforcing member 530 is inserted into the recessed portion 311 of the fixed core 310, the outer circumferential surface 533 may be brought into contact with the inner circumferential surface of the fixed core 310 surrounding the recessed portion 311. In addition, the outer circumferential surface 533 may be brought into contact with an inner circumferential surface of the supporting plate 140.

Accordingly, the magnetic force reinforcing member 530 can be stably seated on the fixed core 310.

The inner circumferential surface 534 may define an inner surface of the magnetic force reinforcing member 530. A space surrounded by the inner circumferential surface 534 may be defined as the hollow portion 535.

The hollow portion 535 may be a space formed through the inside of the magnetic force reinforcing member 530 in the height direction. The shaft 440 may be coupled through the hollow portion 535 to be movable up and down.

The hollow portion 535 may be defined as a space surrounded by the inner circumferential surface 534. A diameter of the hollow portion 535 may be slightly larger than a diameter of the shaft body portion 441.

Accordingly, the magnetic force reinforcing member 530 can be maintained in a fixed state regardless of the vertical movement of the shaft 440.

4. Description of Process of Forming Arc Discharge Path in DC Relay 10 According to Implementation The DC relay 10 according to the implementation may generate electromagnetic force for forming an arc discharge path by using flows of magnetic fields and current.

The current may be applied in response to the movable contactor 430 being brought into contact with the fixed contactor 220. In addition, the magnetic fields may be generated by the magnetic force generating part 500.

Hereinafter, a process of forming an arc discharge path in the DC relay 10 according to the implementation will be described in detail with reference to FIGS. 8 to 13.

In the following description, the first inner portion 511 of the first magnet member 510, the second inner portion 521 of the second magnet member 520, and the second portion 532 of the magnetic force reinforcing member 530 may have the same magnetism.

In addition, the first outer portion 512, the second outer portion 522, and the first portion 531 may have the same magnetism opposite to the above magnetism.

As described above, the first magnet member 510 and the second magnet member 520 may be located adjacent to the left inner surface and the right inner surface of the upper frame 110. In addition, the magnetic force reinforcing member 530 may be located between the first magnet member 510 and the second magnet member 520.

The first fixed contactor **220*a* and the second fixed contactor 220*b* may be located between the first magnet member 510 and the second magnet member 520. The magnetic force reinforcing member 530 may be located between the first fixed contactor 220*a* and the second fixed contactor 220*b* with the same distance from each fixed contactor 220*a* and 220*b***.

Similarly, the magnetic force reinforcing member 530 may be located with being spaced apart by the same distance from the first magnet member 510 and the second magnet member 520.

In addition, current carrying (electric connection) conditions may be classified into two types.

That is, as illustrated in (a) of FIG. 9, a condition may be considered in which current is introduced through the second fixed contactor **220*b* located at the right side, flows through the movable contactor 430, and is discharged through the first fixed contactor 220*a*** located at the left side. Hereinafter, the above condition may be referred to as a "first electric connection (current-carrying) condition".

That is, as illustrated in (b) of FIG. 9, a condition may be considered in which current is introduced through the first fixed contactor **220*a* located at the left side, flows through the movable contactor 430, and is discharged through the second fixed contactor 220*b*** located at the right side. Hereinafter, the above condition may be referred to as a "second electric connection condition".

(1) Description of a Process of Forming an Arc Discharge Path when the First Portion 531 of the Magnetic Force Reinforcing Member 530 has an S Pole Hereinafter, a process of forming an arc discharge path when the first portion 531 of the magnetic force reinforcing member 530 has an S pole will be described with reference to (a) of FIG. 8, and FIGS. 9 to 11.

Figure 8:
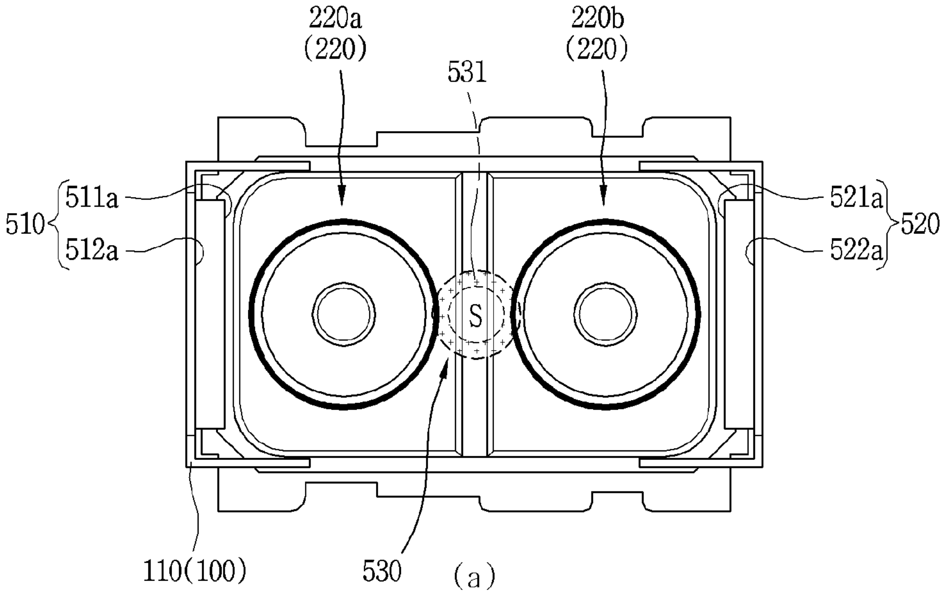
FIG. 8 is a planar view in an open state of an upper frame of the DC relay of FIG. 4, which illustrates (a) a case where an S pole is formed at an upper side of the magnetic force reinforcing member and (b) a case where an N pole is formed at a lower side of the magnetic force reinforcing member.
Figure 8:
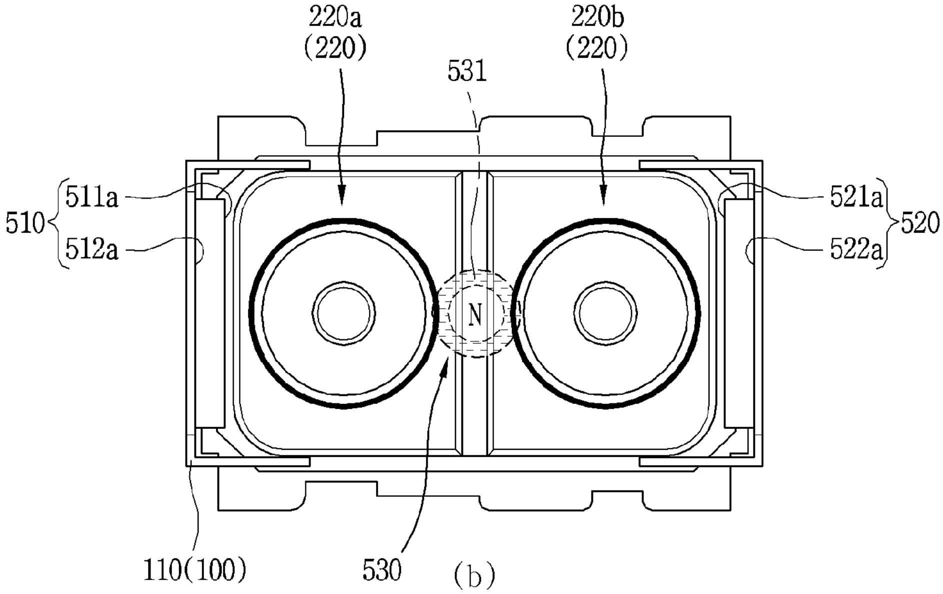

Referring to (a) of FIG. 8, an implementation in which an S pole is formed in the first portion 531 of the magnetic force reinforcing member 530 is illustrated. Although not illustrated, an N pole may be formed in the second portion 532 as aforementioned.

FIG. 10 illustrates flows (paths) (M.P) of magnetic fields generated in the first electric connection condition and a direction (F1) of electromagnetic forces generated accordingly.

In the illustrated implementation, since the first portion 531 has the S pole, the first inner portion 511 and the second inner portion 521 may have the N pole. Considering that the direction of the magnetic field is from the N pole to the S pole, the flows (paths) M.P of the magnetic fields emitted from the first magnet member 510 and the second magnet member 520 may converge to the magnetic force reinforcing member 530 (refer to a first direction A in FIG. 10).

In the first electric connection condition, current C.P may be introduced through the second fixed contactor 220*b*. When applying the Fleming's left-hand rule in the vicinity of the second fixed contactor 220*b*, the electromagnetic forces may be generated in the direction F1 (upward in the illustrated implementation).

Also, the current C.P may flow out through the first fixed contactor 220*a*. When applying the Fleming's left-hand rule in the vicinity of the first fixed contactor 220*a*, the electromagnetic forces may be generated in the direction F1 (upward in the illustrated implementation).

FIG. 11 illustrates flows (paths) (M.P) of magnetic fields generated in the second electric connection condition and a direction F1 of electromagnetic forces generated accordingly.

In the illustrated implementation, since the first portion 531 has the S pole, the first inner portion 511 and the second inner portion 521 may have the N pole. Considering that the direction of the magnetic field is from the N pole to the S pole, the flows (paths) M.P of the magnetic fields emitted from the first magnet member 510 and the second magnet member 520 may converge to the magnetic force reinforcing member 530 (refer to a first direction A in FIG. 11).

In the first electric connection condition, the current C.P may be introduced through the first fixed contactor 220*a*. When applying the Fleming's left-hand rule in the vicinity of the first fixed contactor 220*a*, the electromagnetic forces may be generated in the direction F1 (downward in the illustrated implementation).

Also, the current C.P may flow out through the second fixed contactor 220*b*. When applying the Fleming's left-hand rule in the vicinity of the second fixed contactor 220*b*, the electromagnetic forces may be generated in the direction F1 (downward in the illustrated implementation).

That is, the electromagnetic forces generated in the first fixed contactor 220*a* and the second fixed contactor 220*b* may be applied in the same direction F1. Accordingly, compared to the case where the directions of the electromagnetic forces generated in the respective fixed contacts 220*a* and 220*b* are different from each other, arc extinguishing and discharge paths can be effectively formed.

This may result from that the paths M.P of the magnetic fields emitted from the first magnet member 510 and the second magnet member 520 proceed toward the magnetic force reinforcing member 530 located therebetween.

That is, the paths M.P of the magnetic fields emitted from the first magnet member 510 and the second magnet member 520 may not be biased to any one side. Accordingly, even if the direction of the current in the first fixed contactor 220*a* and the second fixed contactor 220*b* is changed, the electromagnetic forces may be applied in the same direction.

(1) Description of a Process of Forming an Arc Discharge Path when the First Portion 531 of the Magnetic Force Reinforcing Member 530 has an N Pole Hereinafter, a process of forming an arc discharge path when the first portion 531 of the magnetic force reinforcing member 530 has an N pole will be described with reference to (b) of FIG. 8, and FIGS. 9, 12, and 13.

Referring to (b) of FIG. 8, an implementation in which an N pole is formed in the first portion 531 of the magnetic force reinforcing member 530 is illustrated. Although not illustrated, an S pole may be formed in the second portion 532 as aforementioned.

FIG. 12 illustrates flows (paths) (M.P) of magnetic fields generated in the first electric connection condition and a direction F2 of electromagnetic forces generated accordingly.

In the illustrated implementation, since the first portion 531 has the N pole, the first inner portion 511 and the second inner portion 521 may have the S pole. Considering that the direction of the magnetic field is from the N pole to the S pole, the flows (paths) M.P of the magnetic fields emitted from the magnetic force reinforcing member 530 may converge respectively to the first magnet member 510 and the second magnet member 520 (refer to a second direction B in FIG. 12).

In the first electric connection condition, current C.P may be introduced through the second fixed contactor 220*b*. When applying the Fleming's left-hand rule in the vicinity of the second fixed contactor 220*b*, the electromagnetic forces may be generated in the direction F2 (downward in the illustrated implementation).

Also, the current C.P may flow out through the first fixed contactor 220*a*. When applying the Fleming's left-hand rule in the vicinity of the first fixed contactor 220*a*, the electromagnetic forces may be generated in the direction F2 (downward in the illustrated implementation).

FIG. 13 illustrates flows (paths) (M.P) of magnetic fields generated in the second electric connection condition and a direction F2 of electromagnetic forces generated accordingly.

In the illustrated implementation, since the first portion 531 has the N pole, the first inner portion 511 and the second inner portion 521 may have the S pole. Considering that the direction of the magnetic field is from the N pole to the S pole, the flows (paths) M.P of the magnetic fields emitted from the magnetic force reinforcing member 530 may converge respectively to the first magnet member 510 and the second magnet member 520 (refer to a second direction B in FIG. 13).

In the second electric connection condition, the current C.P may be introduced through the first fixed contactor 220*a*. When applying the Fleming's left-hand rule in the vicinity of the first fixed contactor 220*a*, the electromagnetic forces may be generated in the direction F2 (upward in the illustrated implementation).

Also, the current C.P may flow out through the second fixed contactor 220*b*. When applying the Fleming's left-hand rule in the vicinity of the second fixed contactor 220*b*, the electromagnetic forces may be generated in the direction F2 (upward in the illustrated implementation).

That is, the electromagnetic forces generated in the first fixed contactor 220*a* and the second fixed contactor 220*b* may be applied in the same direction F2. Accordingly, compared to the case where the directions of the electromagnetic forces generated in the respective fixed contacts 220*a* and 220*b* are different from each other, arc extinguishing and discharge paths can be effectively formed.

This may result from that the paths M.P of the magnetic fields emitted from the magnetic force reinforcing member 530 may proceed toward the first magnet member 510 and the second magnet member 520.

That is, the paths M.P of the magnetic fields emitted from the first magnet member 510 and the second magnet member 520 may not be biased to any one side. Accordingly, even if the direction of the current in the first fixed contactor 220*a* and the second fixed contactor 220*b* is changed, the electromagnetic forces may be applied in the same direction.

5. Description of Process of Strengthening Driving Force of Movable Core 320 in DC Relay 10 According to Implementation The DC relay 10 according to the implementation of the present disclosure may generate driving force for moving the movable core 320 toward the fixed core 310. The driving force may be generated when the fixed core 310 is magnetized by a magnetic field formed by the coils 350 as control power is applied.

The DC relay 10 according to the implementation of the present disclosure may include the magnetic force reinforcing member 530. The magnetic force reinforcing member 530 may reinforce the driving force for moving the movable core 320 toward the fixed core 310.

Hereinafter, a process of strengthening the driving force of the movable core 320 in the DC relay 10 according to the implementation of the present disclosure will be described in detail with reference to FIG. 14.

As described above, the core part 300 may be electrically connected to an external power supply (not illustrated) to receive control power. When control power is applied, the coils 350 may generate an electromagnetic field.

The fixed core 310 may be magnetized by the electromagnetic field generated by the coils 350. The magnetized fixed core 310 may apply electromagnetic attractive force to the movable core 320 (see solid arrows in FIG. 14). The movable core 320 may be accommodated inside the cylinder 370 to be movable up and down.

Accordingly, the movable core 320 may be moved up toward the fixed core 310. At this time, the return spring 360 may store the restoring force by being compressed, as described above.

In this case, the magnetic force reinforcing member 530 may be located in the recessed portion 311 of the fixed core 310. The magnetic force reinforcing member 530 may be implemented as a permanent magnet capable of generating a magnetic field by itself. That is, the magnetic force reinforcing member 530 may also apply electromagnetic attractive force to the movable core 320 (see dotted arrows in FIG. 14).

Accordingly, the movable core 320 may receive the electromagnetic attractive force in a direction toward the fixed core 310 by the magnetized fixed core 310 and the magnetic force reinforcing member 530. As a result, compared to the case where the movable core 320 is moved only by the electromagnetic attractive force generated by the fixed core 310, stronger electromagnetic attractive force can be applied to the movable core 320.

The electromagnetic attractive force applied by the magnetized fixed core 310 to the movable core 320 may be proportional to strength of the magnetic field generated by the coils 350. In addition, the strength of the magnetic field generated by the coils 350 may be proportional to magnitude of control power applied from the outside, for example, magnitude of current or voltage.

Accordingly, the magnitude of control power to be applied to the coils 350 to apply the same electromagnetic attractive force to the movable core 320 can be reduced.

6. Description of Effects of DC Relay 10 According to Implementation

A magnetic force generating part 500 according to an implementation of the present disclosure may include a first magnet member 510 and a second magnet member 520. In addition, a magnetic force reinforcing member 530 may be located between the first magnet member 510 and the second magnet member 520.

A first inner portion 511 and a second inner portion 521 of the first magnet member 510 and the second magnet member 520 that face each other may have the same polarity. In addition, a first portion 531 of the magnetic force reinforcing member 530 may have different polarity from the first inner portion 511 and the second inner portion 521.

Accordingly, a path M.P of magnetic fields generated by the magnetic force generating part 500 may proceed in a direction from the first magnet member 510 and the second magnet member 520 toward the magnetic force reinforcing member 530, or vice versa.

That is, a distance by which the path M.P of the magnetic fields moves within the arc chamber 210 can be reduced by the magnetic force reinforcing member 530. This may result in reinforcing the flow M.P of the magnetic fields generated inside the DC relay 10.

In addition, the magnetic force reinforcing member 530 may be coupled through a shaft 440. The magnetic force reinforcing member 530 may be inserted into a recessed portion 311 which is recessed in an upper side of a fixed core 310.

Accordingly, the magnetic force reinforcing member 530 can be provided without excessively changing an internal structure of the DC relay 10.

In addition, the magnetic force reinforcing member 530 can reinforce paths (flows) M.P of magnetic fields generated by the first magnet member 510 and the second magnet member 520.

Accordingly, the paths M.P of the magnetic fields having sufficient strength can be formed without increasing volumes of the first magnet member 510 and the second magnet member 520.

Also, the paths M.P of the magnetic fields generated in an arc chamber 210 can be formed to proceed from the first magnet member 510 and the second magnet member 520 toward the magnetic force reinforcing member 530. Alternatively, the paths M.P of the magnetic fields can be formed to proceed from the magnetic force reinforcing member 530 toward the first magnet member 510 and the second magnet member 520.

Accordingly, the flows M.P of the magnetic fields generated in the vicinity of fixed contacts 220*a* and 220*b*, respectively, can proceed in different directions. This may facilitate the change in direction for extinguishing arc according to an environment in which the DC relay 10 is provided. This may result in improving user convenience.

In addition, the flows M.P of the magnetic fields generated by the first magnet member 510, the second magnet member 520, and the magnetic force reinforcing member 530 can generate electromagnetic forces in the same direction near the respective fixed contacts 220*a* and 220*b*.

Therefore, even if a direction of current applied to each of the fixed contacts 220*a* and 220*b* is changed, arc generated in each of the fixed contacts 220*a* and 220*b* can receive electromagnetic forces all flowing toward any one of the front and the rear of the DC relay 10. Accordingly, the user does not need to connect a power supply and a load to the DC relay 10 according to polarities, thereby increasing the user convenience.

In addition, when current flows on coils 350 and the fixed core 310 is magnetized, the fixed core 310 can apply electromagnetic attractive force to the movable core 320. At this time, the magnetic force reinforcing member 530 can also apply electromagnetic attractive force to the movable core 320.

Therefore, compared to a case where only electromagnetic attractive force by the fixed core 310 is applied to the movable core 320, driving force applied to the movable core 320 can be increased. This may result in improving reliability of an operation of the DC relay 10.

Even if magnitude of control power applied to the coils 350 is decreased, electromagnetic attractive force corresponding to the decrease can be compensated for by the magnetic force reinforcing member 530. Accordingly, magnitude of control power for moving the movable core 320 can be decreased, resulting in improving power efficiency of the DC relay 10.

Although it has been described above with reference to preferred implementations of the present disclosure, it will be understood that those skilled in the art are able to variously modify and change the present disclosure without departing from the spirit and scope of the invention described in the claims below.

REFERENCE NUMERALS

10: DC relay
100: Frame part
110: Upper frame
120: Lower frame
130: Insulating plate
140: Supporting plate
200: Opening/closing part
210: Arc chamber
220: Fixed contactor
220*a*: First fixed contactor
220*b*: Second fixed contactor
230: Sealing member
300: Core part
310; Fixed core
311: Recessed portion
320: Movable core
330: Yoke
340: Bobbin
350: Coil
360: Return spring
370: Cylinder
400: Movable contactor part
410: Housing
420: Cover
430: Movable contactor
431: Contact protrusion
440: Shaft
441: Shaft body portion
442: Shaft head portion
443: Shaft tail portion
450: Elastic portion
500: Magnetic force generating part
510: First magnet member
511: First inner portion
511*a*: First inner surface
512: First outer portion
512*a*: First inner surface
520: Second magnet member
521: Second inner portion
521*a*: Second inner surface
522: Second outer portion
522*a*: Second outer surface
530: Magnetic force reinforcing member
531: First portion
532: Second portion
533: Outer circumferential surface
534: Inner circumferential surface
535: Hollow portion
1000: DC relay according to the related art
1100: Contact part according to the related art
1110: Fixed contact according to the related art
1120: Movable contact according to the related art
1130: Return spring according to the related art
1200: Permanent magnet according to the related art
1300: Core part according to the related art
1310: Fixed core according to the related art
1320: Movable core according to the related art
1321: Spring according to the related art
1330: Shaft according to the related art
1340: Bobbin according to the related art
1350: Coil according to the related art
1360: Yoke according to the related art
A: First direction
B: Second direction
F1: Direction of electromagnetic force in first electric connection condition
F1: Direction of electromagnetic force in second electric connection condition
M.P: Magnetic path
C.P: Current path

The invention claimed is:

1. A Direct Current (DC) relay comprising:

a fixed contactor;

a movable contactor longitudinally extending in a first longitudinal direction and having a first side located adjacent to the fixed contactor to be brought into contact with or separated from the fixed contactor;

a first magnet member longitudinally extending in a second longitudinal direction perpendicular to the first longitudinal direction and that is located adjacent to a first end face of the movable contactor;

a second magnet member longitudinally extending in the second longitudinal direction and that is located adjacent to a second end face of the movable contactor opposite to the first end face in the first longitudinal direction;

a magnetic force reinforcing member located between the first magnet member and the second magnet member in the first longitudinal direction to form magnetic fields together with the first magnet member and the second magnet member;

a fixed core located on a second side of the movable contactor opposite to the first side of the movable contactor, wherein the fixed core is magnetized when control power is applied, the fixed core having a first side facing the second side of the movable contactor and a second side opposite to the first side, the first side of the fixed core defining a recess in which the magnetic force reinforcing member is accommodated; and a movable core located on the second side of the fixed core and configured to move toward the movable contactor when the fixed core is magnetized, wherein the magnetic force reinforcing member is located on the second side of the movable contactor;

wherein a first side of the first magnet member and a first side of the second magnet member that face one another both have a first polarity, and wherein a first side of the magnetic force reinforcing member that faces the movable contactor has a second polarity different from the first polarity.

2. The direct current relay of claim 1, wherein the fixed contactor is disposed between the first magnet member and the second magnet member, where the fixed contactor comprises:

a first fixed contactor disposed closer to the first side of the movable contactor than to a second side of the movable contactor that is opposite to the first side in the first longitudinal direction; and a second fixed contactor disposed closer to the second side of the movable contactor than to the first side.

3. The direct current relay of claim 2, wherein the magnetic force reinforcing member is located between the first fixed contactor and the second fixed contactor in the first longitudinal direction of the movable contactor.

4. The direct current relay of claim 2, wherein a first one of the first fixed contactor or the second fixed contactor is electrically connected to an external power supply, and wherein a second one of the first fixed contactor and the second fixed contactor is electrically connected to an external load.

5. The direct current relay of claim 1, wherein directions of the magnetic fields generated by the first magnet member, the second magnet member, and the magnetic force reinforcing member is one of:

a first direction from the first magnet member and the second magnet member toward the magnetic force reinforcing member; and a second direction from the magnetic force reinforcing member toward the first magnet member and the second magnet member.

6. The direct current relay of claim 1, wherein the magnetic force reinforcing member is located between the movable contactor and the fixed core to apply attractive force to the movable core in a direction toward the fixed core.

7. The direct current relay of claim 6, further comprising coils disposed to surround the fixed core and the movable core to generate an electromagnetic field when the control power is applied, wherein the fixed core is magnetized by the electromagnetic field generated by the coils.

8. The direct current relay of claim 7, wherein the fixed core applies attractive force to the movable core in the direction toward the fixed core when the fixed core is magnetized, and wherein the magnetic force reinforcing member applies attractive force to the movable core in a direction toward the magnetic force reinforcing member.

9. The direct current relay of claim 1, further comprising:

a shaft extending in a third longitudinal direction, and connected to the movable contactor so as to be movable toward or away from the fixed contactor together with the movable contactor;

the fixed core having the shaft inserted therethrough, and magnetized when control power is applied; and wherein the magnetic force reinforcing member is located between the fixed core and the movable contactor, having the shaft movably coupled therethrough, and configured to apply attractive force to the movable core.

10. The direct current relay of claim 9, wherein the magnetic force reinforcing member has a cylindrical shape extending in the third longitudinal direction, and wherein a hollow portion is formed through a center of the magnetic force reinforcing member in the third longitudinal direction, and the shaft is coupled through the hollow portion.

11. A Direct Current (DC) relay comprising:

a fixed contactor;

a movable contactor extending in a first longitudinal direction and having a first side located adjacent to the fixed contactor to be brought into contact with or separated from the fixed contactor;

a first magnet member extending in a second longitudinal direction perpendicular to the first longitudinal direction and that is located adjacent to a first end face of the movable contactor;

a second magnet member extending in the second longitudinal direction and that is located adjacent to a second end face of the movable contactor opposite to the first end face in the first longitudinal direction;

a magnetic force reinforcing member located between the first magnet member and the second magnet member in the first longitudinal direction to form magnetic fields together with the first magnet member and the second magnet member, a fixed core located on a second side of the movable contactor opposite to the first side of the movable contactor, wherein the fixed core is magnetized when control power is applied, the fixed core having a first side facing the second side of the movable contactor and a second side opposite to the first side, the first side of the fixed core defining a recess in which the magnetic force reinforcing member is accommodated; and a movable core located on the second side of the fixed core and configured to move toward the movable contactor when the fixed core is magnetized, wherein a first side of the first magnet member and a first side of the second magnet member that face one another both have a first polarity; and wherein a first side of the magnetic force reinforcing member that faces the movable contactor has a second polarity different from the first polarity.

12. A Direct Current (DC) relay comprising:

a fixed contactor;

a movable contactor having:

a first end face, extending in a first direction for a first length;

a second end face, extending in the first direction for the first length;

a third end face, extending in a second direction perpendicular to the first direction for a second length, less than the first length, between the first end face and the second end face of the movable contactor;

a fourth end face, extending in the second direction for the second length between the first end face and the second end face of the movable contactor; and first side disposed perpendicularly to the first end face, the second end face, the third end face, and the fourth end face, being configured to be brought into contact with or separated from the fixed contactor;

a first magnet member disposed on a first end of the movable contactor and having:

a first end face, coplanar to the first end face of the movable contactor and extending in the first direction for a third length;

a second end face, coplanar to the second end face of the movable contactor and extending in the first direction for the third length;

a third end face, parallel to the third end face of the movable contactor and extending in the second direction for the second length between the first end face and the second end face of the first magnet member;

a fourth end face, parallel to the third end face of the movable contactor and extending in the second direction for the second length between the first end face and the second end face of the first magnet member;

a second magnet member disposed on a second end of the movable contactor, opposite to the first end of the movable contactor, and having:

a first end face, coplanar to the first end face of the movable contactor and extending in the first direction for the third length;

a second end face, coplanar to the second end face of the movable contactor and extending in the first direction for the third length;

a third end face, parallel to the fourth end face of the movable contactor and extending in the second direction for the second length between the first end face and the second end face of the second magnet member;

a fourth end face, parallel to the fourth end face of the movable contactor and extending in the second direction for the second length between the first end face and the second end face of the second magnet member; and a magnetic force reinforcing member located between the first magnet member and the second magnet member in the first direction, configured to form magnetic fields together with the first magnet member and the second magnet member.

* * * * *